(12) United States Patent
Alexander et al.

(10) Patent No.: US 8,480,406 B2
(45) Date of Patent: Jul. 9, 2013

(54) INTERFACE DEVICE AND METHOD FOR INTERFACING INSTRUMENTS TO MEDICAL PROCEDURE SIMULATION SYSTEMS

(75) Inventors: David Alexander, Purcellville, VA (US); J. Michael Brown, Washington, DC (US); Eric Cabahug, Fairfax, VA (US); Philip J. Churchill, Silver Spring, MD (US); Robert F. Cohen, Burtonsville, MD (US); Richard L. Cunningham, Arlington, VA (US); Ben Feldman, McLean, VA (US); Diego Fontayne, Montebello, NY (US); Gregory L. Merril, Chevy Chase, MD (US); Mario Turchi, Leonia, NJ (US)

(73) Assignee: Immersion Medical, Inc., Baltimore, MD (US)

( * ) Notice: Subject to any disclaimer, the term of this patent is extended or adjusted under 35 U.S.C. 154(b) by 1127 days.

(21) Appl. No.: 11/204,646

(22) Filed: Aug. 15, 2005

(65) Prior Publication Data

US 2006/0046235 A1 Mar. 2, 2006

Related U.S. Application Data

(63) Continuation of application No. 09/237,969, filed on Jan. 27, 1999, now Pat. No. 6,929,481, which is a continuation-in-part of application No. 08/923,477, filed on Sep. 4, 1997, now Pat. No. 6,106,301.

(60) Provisional application No. 60/025,433, filed on Sep. 4, 1996, provisional application No. 60/072,672, filed on Jan. 28, 1998, provisional application No. 60/105,661, filed on Oct. 26, 1998, provisional application No. 60/116,545, filed on Jan. 21, 1999.

(51) Int. Cl.
*G09B 23/28* (2006.01)

(52) U.S. Cl.
USPC .......................... 434/270; 434/262; 434/267

(58) Field of Classification Search
USPC ........................................................ 434/262
See application file for complete search history.

(56) References Cited

U.S. PATENT DOCUMENTS

| 1,889,330 A | 11/1932 | Humes et al. |
| 2,972,140 A | 9/1958 | Hirsch |

(Continued)

FOREIGN PATENT DOCUMENTS

| EP | 0 349 086 | 6/1988 |
| EP | 0 970 714 | 1/2000 |

(Continued)

OTHER PUBLICATIONS

Adelstein, "A Virtual Environment System for the Study of Human Arm Tremor", Ph.D. Dissertation, Dept. of Mechanical Engineering, MIT, Jun. 1989, 33 pages.

(Continued)

*Primary Examiner* — Nikolai A Gishnock
(74) *Attorney, Agent, or Firm* — Kilpatrick Townsend & Stockton LLP

(57) ABSTRACT

An interface device and method for interfacing instruments to a medical procedure simulation system serve to interface peripherals in the form of mock medical instruments to the medical procedure simulation system computer to enable simulation of medical procedures. The interface device includes a housing having a mock bodily region of interest to facilitate insertion of a mock instrument, such as an endoscope tube, into the interface device. The mock bodily region of interest may be pivotable to simulate various patient orientations. The instrument is engaged by a capture mechanism in order to measure rotational and translational motion of the instrument. An actuator is disposed within the interface device to provide force feedback to the instrument. The measured motion is provided to the computer system to reflect instrument motion on the display during the simulation. Alternatively, the interface device may be configured to accommodate instrument assemblies having a plurality of nested instruments (e.g., sheath, catheter and wire), whereby the interface device individually grasps, measures manipulation of and provides force feedback to the nested instruments. In addition, the interface device may be configured to simultaneously accommodate a plurality of independently inserted instruments.

20 Claims, 14 Drawing Sheets

U.S. PATENT DOCUMENTS

| | | |
|---|---|---|
| 3,157,853 A | 11/1964 | Hirsch |
| 3,220,121 A | 11/1965 | Cutler |
| 3,226,846 A | 1/1966 | Wood |
| 3,304,434 A | 2/1967 | Koster |
| 3,497,668 A | 2/1970 | Hirsch |
| 3,517,446 A | 6/1970 | Corlyon et al. |
| 3,520,060 A | 7/1970 | Crabtree et al. |
| 3,541,541 A | 11/1970 | Engelbart |
| 3,623,064 A | 11/1971 | Kagan |
| 3,748,366 A | 7/1973 | Rader et al. |
| 3,775,865 A | 12/1973 | Kowan |
| D233,238 S | 10/1974 | Reid et al. |
| 3,902,687 A | 9/1975 | Hightower |
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salisbury, Jr. |
| 4,236,325 A | 12/1980 | Hall et al. |
| 4,262,549 A | 4/1981 | Schwellenbach |
| 4,321,047 A | 3/1982 | Landis |
| 4,333,070 A | 6/1982 | Barnes |
| 4,360,345 A | 11/1982 | Hon |
| 4,409,479 A | 10/1983 | Sprague et al. |
| 4,423,428 A | 12/1983 | Kuwabara et al. |
| D272,833 S | 2/1984 | van Assche et al. |
| 4,439,162 A | 3/1984 | Blaine |
| 4,459,113 A | 7/1984 | Boscaro Gatti et al. |
| 4,464,117 A | 8/1984 | Foerst |
| 4,484,191 A | 11/1984 | Vavra |
| 4,490,810 A | 12/1984 | Hon |
| 4,513,235 A | 4/1985 | Acklam et al. |
| 4,581,491 A | 4/1986 | Boothroyd |
| 4,599,070 A | 7/1986 | Hladky et al. |
| 4,642,055 A | 2/1987 | Saliterman |
| 4,708,656 A | 11/1987 | de Vries et al. |
| 4,712,101 A | 12/1987 | Culver |
| 4,713,007 A | 12/1987 | Alban |
| 4,726,772 A | 2/1988 | Amplatz |
| 4,767,333 A | 8/1988 | Born |
| 4,773,865 A | 9/1988 | Baldwin |
| 4,775,563 A | 10/1988 | Kaempen |
| 4,789,340 A | 12/1988 | Zikria |
| 4,794,392 A | 12/1988 | Selinko |
| 4,804,328 A | 2/1989 | Barrabee |
| 4,807,158 A | 2/1989 | Blanton et al. |
| 4,846,154 A * | 7/1989 | MacAnally et al. .......... 600/171 |
| 4,867,168 A | 9/1989 | Stoor et al. |
| 4,867,685 A | 9/1989 | Brush et al. |
| 4,879,668 A | 11/1989 | Cline et al. |
| 4,885,565 A | 12/1989 | Embach |
| 4,891,764 A | 1/1990 | McIntosh |
| 4,907,973 A | 3/1990 | Hon |
| 4,930,770 A | 6/1990 | Baker |
| 4,934,694 A | 6/1990 | McIntosh |
| 4,936,862 A | 6/1990 | Walker et al. |
| 4,936,892 A | 6/1990 | Gehring et al. |
| 4,955,654 A | 9/1990 | Tsuchihashi et al. |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,044,956 A | 9/1991 | Behensky et al. |
| 5,077,608 A | 12/1991 | Dubner |
| 5,078,152 A | 1/1992 | Bond et al. |
| 5,086,401 A | 2/1992 | Glassman et al. |
| 5,099,846 A | 3/1992 | Hardy |
| 5,112,228 A | 5/1992 | Zouras |
| 5,113,872 A | 5/1992 | Jahrmarkt et al. |
| 5,130,794 A | 7/1992 | Ritchey |
| 5,137,458 A | 8/1992 | Ungs et al. |
| 5,149,270 A | 9/1992 | McKeown |
| 5,165,897 A | 11/1992 | Johnson |
| 5,175,459 A | 12/1992 | Danial et al. |
| 5,185,561 A | 2/1993 | Good et al. |
| 5,186,695 A | 2/1993 | Mangseth et al. |
| 5,205,289 A | 4/1993 | Hardy et al. |
| 5,205,822 A * | 4/1993 | Johnson et al. ............ 606/192 |
| 5,212,473 A | 5/1993 | Louis |
| 5,220,260 A | 6/1993 | Schuler |
| 5,222,499 A | 6/1993 | Allen et al. |
| 5,231,996 A * | 8/1993 | Bardy et al. .................. 607/126 |
| 5,240,417 A | 8/1993 | Smithson et al. |
| 5,261,404 A | 11/1993 | Mick et al. |
| 5,271,290 A | 12/1993 | Fischer |
| 5,273,038 A | 12/1993 | Beavin |
| 5,275,174 A | 1/1994 | Cook |
| 5,283,970 A | 2/1994 | Aigher |
| 5,290,232 A * | 3/1994 | Johnson et al. ............... 606/194 |
| 5,290,276 A | 3/1994 | Sewell, Jr. |
| 5,295,694 A | 3/1994 | Levin |
| 5,299,810 A | 4/1994 | Pierce et al. |
| 5,309,140 A | 5/1994 | Everett, Jr. et al. |
| 5,311,422 A | 5/1994 | Loftin et al. |
| 5,320,326 A | 6/1994 | Ju et al. |
| 5,320,537 A | 6/1994 | Watson |
| 5,320,538 A | 6/1994 | Baum |
| 5,322,441 A | 6/1994 | Lewis et al. |
| 5,333,106 A | 7/1994 | Lanpher et al. |
| 5,334,027 A | 8/1994 | Wherlock |
| 5,338,198 A | 8/1994 | Wu et al. |
| 5,343,871 A | 9/1994 | Bittman et al. |
| 5,354,202 A | 10/1994 | Moncrief et al. |
| 5,376,007 A | 12/1994 | Zirm |
| 5,377,116 A | 12/1994 | Wayne et al. |
| 5,385,474 A | 1/1995 | Brindle |
| 5,389,865 A | 2/1995 | Jacobus et al. |
| 5,391,081 A | 2/1995 | Lampotang et al. |
| 5,403,191 A | 4/1995 | Tuason |
| 5,414,337 A | 5/1995 | Schuler |
| 5,436,622 A | 7/1995 | Gutman et al. |
| 5,437,607 A | 8/1995 | Taylor |
| 5,438,529 A | 8/1995 | Rosenberg et al. |
| 5,451,924 A | 9/1995 | Massimino et al. |
| 5,454,722 A | 10/1995 | Holland et al. |
| 5,459,382 A | 10/1995 | Jacobus et al. |
| 5,463,712 A * | 10/1995 | Cawood ......................... 385/117 |
| 5,466,213 A | 11/1995 | Hogan et al. |
| 5,476,493 A | 12/1995 | Muff |
| 5,480,307 A | 1/1996 | Lang et al. |
| 5,482,472 A | 1/1996 | Garoni et al. |
| 5,483,254 A | 1/1996 | Powell |
| 5,483,961 A | 1/1996 | Kelly et al. |
| 5,509,810 A | 4/1996 | Schertz et al. |
| 5,510,832 A | 4/1996 | Garcia |
| 5,513,992 A | 5/1996 | Refait |
| 5,518,406 A | 5/1996 | Waters |
| 5,531,227 A | 7/1996 | Schneider |
| 5,546,943 A | 8/1996 | Gould |
| 5,547,382 A | 8/1996 | Yamasaki et al. |
| 5,552,995 A | 9/1996 | Sebastian |
| 5,559,412 A | 9/1996 | Schuler |
| 5,567,047 A | 10/1996 | Fritsch |
| 5,575,761 A | 11/1996 | Hajianpour |
| 5,576,727 A | 11/1996 | Rosenberg et al. |
| 5,589,854 A | 12/1996 | Tsai |
| 5,593,306 A | 1/1997 | Kohnke |
| 5,609,485 A | 3/1997 | Bergman et al. |
| 5,613,937 A | 3/1997 | Garrison et al. |
| 5,617,498 A * | 4/1997 | Cawood ......................... 385/117 |
| 5,623,582 A | 4/1997 | Rosenberg |
| 5,629,594 A | 5/1997 | Jacobus et al. |
| 5,666,138 A | 9/1997 | Culver |
| 5,667,517 A | 9/1997 | Hooven |
| 5,682,886 A | 11/1997 | Delp et al. |
| 5,687,259 A | 11/1997 | Linford |
| 5,690,582 A | 11/1997 | Ulrich et al. |
| 5,691,898 A | 11/1997 | Rosenberg et al. |
| 5,701,140 A | 12/1997 | Rosenberg et al. |
| 5,702,419 A * | 12/1997 | Berry et al. .................. 623/1.13 |
| 5,704,791 A | 1/1998 | Gillio |
| 5,721,566 A | 2/1998 | Rosenberg et al. |
| D392,878 S | 3/1998 | Nordstrom et al. |
| 5,722,836 A | 3/1998 | Younker |
| 5,724,264 A | 3/1998 | Rosenberg et al. |
| 5,731,804 A | 3/1998 | Rosenberg |
| 5,734,373 A | 3/1998 | Rosenberg et al. |

| | | | |
|---|---|---|---|
| 5,739,811 A | 4/1998 | Rosenberg et al. | |
| 5,740,802 A | 4/1998 | Nafis et al. | |
| 5,742,278 A | 4/1998 | Chen et al. | |
| 5,746,753 A | 5/1998 | Sullivan et al. | |
| 5,755,577 A | 5/1998 | Gillio | |
| 5,766,016 A | 6/1998 | Sinclair et al. | |
| 5,767,839 A | 6/1998 | Rosenberg | |
| 5,768,134 A | 6/1998 | Swaelens et al. | |
| 5,769,640 A | 6/1998 | Jacobus et al. | |
| 5,769,650 A | 6/1998 | Aoyama et al. | |
| 5,772,836 A | 6/1998 | Ogawa | |
| 5,785,630 A | 7/1998 | Bobick et al. | |
| 5,791,908 A | 8/1998 | Gillio | |
| 5,800,177 A | 9/1998 | Gillio | |
| 5,800,178 A | 9/1998 | Gillio | |
| 5,800,179 A | 9/1998 | Bailey | |
| 5,805,140 A | 9/1998 | Rosenberg et al. | |
| 5,807,115 A | 9/1998 | Hu | |
| 5,817,107 A | 10/1998 | Schaller | |
| 5,820,600 A * | 10/1998 | Carlson et al. | 604/167.03 |
| 5,821,920 A | 10/1998 | Rosenberg et al. | |
| 5,825,308 A | 10/1998 | Rosenberg | |
| 5,825,941 A | 10/1998 | Linford et al. | |
| 5,828,197 A | 10/1998 | Martin et al. | |
| 5,853,292 A | 12/1998 | Eggert et al. | |
| 5,855,583 A | 1/1999 | Wang et al. | |
| 5,873,731 A | 2/1999 | Prendergast | |
| 5,873,732 A | 2/1999 | Hasson | |
| 5,880,976 A | 3/1999 | DiGioia, III et al. | |
| 5,882,206 A | 3/1999 | Gillio | |
| 5,882,207 A | 3/1999 | Lampotang et al. | |
| 5,889,670 A | 3/1999 | Schuler et al. | |
| 5,890,908 A | 4/1999 | Lampotang et al. | |
| 5,891,131 A | 4/1999 | Rajan et al. | |
| 5,909,380 A | 6/1999 | Dubois et al. | |
| 5,910,146 A * | 6/1999 | Alexander | 606/122 |
| 5,941,710 A | 8/1999 | Lampotang et al. | |
| 5,945,056 A | 8/1999 | Day et al. | |
| 5,947,743 A | 9/1999 | Hasson | |
| 5,951,301 A | 9/1999 | Younker | |
| 5,956,040 A | 9/1999 | Asano et al. | |
| 5,967,790 A | 10/1999 | Strover et al. | |
| 5,995,738 A | 11/1999 | DiGioia, III et al. | |
| 6,057,828 A | 5/2000 | Rosenberg et al. | |
| 6,062,865 A | 5/2000 | Bailey | |
| 6,086,528 A | 7/2000 | Adair | |
| 6,104,382 A | 8/2000 | Martin et al. | |
| 6,111,577 A | 8/2000 | Zilles et al. | |
| 6,160,489 A | 12/2000 | Perry et al. | |
| 6,223,100 B1 | 4/2001 | Green | |
| 6,302,908 B1 * | 10/2001 | Parodi | 623/1.31 |
| 6,377,011 B1 | 4/2002 | Ben-Ur | |
| 6,422,941 B1 | 7/2002 | Thorner et al. | |
| 6,876,891 B1 | 4/2005 | Schuler et al. | |

FOREIGN PATENT DOCUMENTS

| | | |
|---|---|---|
| GB | 2 252 656 | 8/1992 |
| GB | 2 288 686 | 10/1995 |
| JP | H2-185278 | 1/1989 |
| JP | H4-8381 | 4/1990 |
| JP | H5-192449 | 1/1992 |
| JP | H7-24147 | 7/1993 |
| JP | 6506301 | 7/1994 |
| WO | WO 95/02233 | 1/1995 |
| WO | WO 96/28800 A1 | 9/1996 |

OTHER PUBLICATIONS

Adelstein et al., "Design and Implementation of a Force Reflecting Manipulandum for Manual Control Research", DSC-vol. 42, Advances in Robotics ASME, 1992, pp. 1-12.

Aukstakalnis, et al., "Silicon Mirage: The Art and Science of Virtual Reality", 1992, pp. 129-180.

Baigrie, Stephan A., "Electric Control Loading—A Low Cost, High Performance Alternative", Proceedings of Interservice/Industry Training Systems Conference, Nov. 6-8, 1990 pp. 247-254.

Bejczy, et al., "A Laboratory Breadboard System for Dual-Arm Teleoperation", SOAR '89 Workshop, Jul. 25-27, 1989, pp. 1-12.

Bejczy et al., "Generalization of Bilateral Force-Reflecting Control of Manipulators", Proceedings of Fourth CISM-IFToMM, Sep. 8-12, 1981.

Bejczy et al., "Kinesthetic Coupling Between Operator and Remote Manipulator", International Computer Technology Conference, The American Society of Mechanical Engineers, Aug. 12-15, 1980.

Bejczy, "Sensors, Controls, and Man-Machine Interface for Advanced Teleoperation", Science, vol. 208, No. 4450, 1980, pp. 1327-1335.

Bejczy et al., "Universal Computer Control System (UCCS) for Space Telerobots", IEEE, Mar. 31-Apr. 3, 1987, pp. 318-324.

Bliss et al., "Optical-to-Tactile Image Conversion for the Blind", IEEE Transaction of Man-Machine Systems, vol. MMS-11, No. 1, Mar. 1970, pp.'58-65.

Brooks et al., "Hand Controllers for Teleoperation", A State-of-the-Art Technology Survey and Evaluation, JPL Publication 85-11, Mar. 1, 1985, pp. 1-84.

Burdea et al., "Distributed Virtual Force Feedback", IEEE International Conference on Robotics and Automation, May 2, 1993, pp. 25-44.

Caldwell et al., "Enhanced Tactile Feedback (Tele-Taction) Using a Multi-Functional Sensory System", IEEE, 1993, pp. 955-960.

Cyberman Technology Specification, Logic Cyberman SWIFT Supplement to Logitech Mouse Reference and Programming Guide, Apr. 5, 1994, pp. 1-29.

Calder, "Design of a Force-Feedback Touch-Inducing Actuator for Teleoperator Robot Control", Bachelor of Science Thesis, MIT, May 1993, pp. 1-37.

Eberhardt et al., "Inducing Dynamic Haptic Perception by the Hand: System Description and Some Results", DSC-vol. 56-1, Dynamic Systems and Control, vol. 1, ASME, 1984, pp. 345-351.

Eberhardt et al., "OMAR-A Haptic Display for Speech Perception by Deaf and Deaf-Blind Individuals", IEEE, 1993, pp. 195-201.

Gobel et al., "Tactile Feedback Applied to Computer Mice", International Journal of Human-Computer Interaction, vol. 7, No. 1, 1995, pp. 1-5.

Gotow et al., "Controlled Impedance Test Apparatus for Studying Human Interpretation of Kinesthetic Feedback", Proceedings of the 1989 American Control Conference, Jun. 21-23, 1989, pp. 332-337.

Howe, "A Force-Reflecting Teleoperated Hand System for the Study of Tactile Sensing in Precision Manipulation", IEEE, 1992, pp. 1321-1326.

IBM Technical Disclosure Bulletin, "Mouse Ball-Actuating Device with Force and Tactile Feedback", vol. 32, No. 9B, Feb. 1990.

Iwata, "Pen-Based Haptic Virtual Environment", IEEE, 1993, pp. 287-292.

Jacobsen et al., "High Performance, Dextrous Telerobotic Manipulator with Force Reflection", Intervention/ROV '91, Conference & Exposition, May 21-23, 1991, pp. 213-218.

Johnson, "Shape-Memory Alloy Tactical Feedback Actuator", Armstrong Aerospace Medical Research Laboratory, Aug. 1990, pp. 1-33.

Jones et al., "A Perceptual Analysis of Stiffness", Experimental Brain Research, vol. 79, No. 1, 1990, pp. 150-156.

Kacamarek et al., "Tactile Displays", Virtual Environment Technologies, Chapter 9, 1995, pp. 349-414.

Kontarinis et al., "Display of High-Frequency Tactile Information to Teleoperators", SPIE vol. 2057, 1993, pp. 40-50.

Kontarinis et al., "Tactile Display of Vibratory Information in Teleoperation and Virtual Environments", Presence, 1995, pp. 1-24.

Lake, CYBERMAN from Logitech, 1994.

Marcus, "Touch Feedback in Surgery", Proceeding Cutting Edge, Sep. 8-11, 1994, pp. 96-97.

McAffee et al., "Teleoperator Subsystem/Telerobot Demonstrator: Force Reflecting Hand Controller Equipment Manual", Jan. 1988.

Minsky, "Computational Haptics: The Sandpaper System for Synthesizing Texture for a Force-Feedback Display", Ph.D. Dissertation, MIT, Jun. 1995.

Noll, "Man-Machine Tactile", SID Journal, Jul./Aug. 1972.

Ouhyoung, et al., "A Low-Cost Force Feedback Joystick and its Use in PC Video Games", IEEE Transactions on Consumer Electronics, vol. 41, No. 3, Aug. 1995.

Ouh-young, "Force Display in Molecular Docking", Doctoral Dissertation, 1990, pp. 1-369.

Ouhyoung et al., "The Development of a Low-Cost Force Feedback Joystick and its Use in the Virtual Environment", Proceedings of the Third Pacific Conference on Computer Graphics and Applications, Aug. 21-24, 1995, pp. 309-319.

Patrick et al., "Design and Testing of a Non-Reactive, Fingertip, Tactile Display for Interaction with Remote Environment", Cooperative Intelligent Robotics in Space, SPIE vol. 1387, 1990, pp. 215-222.

Patrick, "Design, Construction, and Testing of a Fingertip Tactile Display for Interaction with Virtual and Remote Environments", Aug. 1990, pp. 1-109.

Pimentel et al., Virtual Reality Through the New Looking Glass, 1994, pp. 41-202.

Rabinowitz et al., "Multidimensional Tactile Displays: Identification of Vigratory Intensity, Frequency, and Contractor Area", Journal of the Accoustical Society of America vol. 82, No. 4, Oct. 1987, pp. 1243-1252.

Rosenberg, "Virtual Fixtures: Preceptual Overlays Enhance Operator Performance in Telepresence Tasks", Ph.D. Dissertation, Jun. 1994.

Russo et al., "Controlling Dissipative Magnetic Particle Brakes in Force Reflective Devices", Advances in Robotics ASME, DSC-vol. 42, 1992, pp. 63-70.

Russo, "The Design and Implementation of a Three Degree of Freedom Force Output Joystick", MIT Libraries Archives, May 1990, pp. 1-131.

Safe Flight Instrument Corporation, Component Maintenance Manual Coaxial Control Shaker Part No. C-25502, Jul. 1, 1987, 3 pages.

Safe Flight Instrument Corp, Technical Manual Overhaul Instructions with Parts Breakdown, Coaxial Control Shaker Part No. C-25502, Jul. 15, 1980, 21 pages.

Scannell, "Taking a Joystick Ride", Computer Currents, Boston Edition vol. 9, No. 11, Nov. 1994, 3 pages.

Shimoga, "Finger Force and touch Feedback Issues in Dexterous Telemanipulation", Proceedings of Fourth Annual Conference on Intelligent Robotic Systems for Space Exploration, Sep. 30-Oct. 1, 1992, pp. 159-178.

Snow et al., "Model-X Force-Reflecting-Hand-Controller", Jun. 15, 1989.

Stanley et al., "Computer Simulation of Interacting Dynamic Mechanical Systems Using Distributed Memory Parallel Processors", Advances in Robotics ASME, DSC-vol. 42, 1992, pp. 55-61.

Tadros, "Control System Design for a Three Degree of Freedom Virtual Environment Simulator Using Motor/Brake Pair Actuators", MIT Archive, Feb. 2, 1990, pp. 2-88.

Terry et al., "Tactile Feedback in a Computer Mouse", Proceedings of Fourteenth Annual Northeast Bioengineering Conference, Mar. 10-11, 1988, pp. 146-149.

Wiker, "Teletouch Display Development Phase 1 Report", Technical Report 1230, Jul. 1988.

Yamakita et al., "Tele-Virtual Reality of Dynamic Mechanical Model", IEEE, 1992, pp. 1103-1110.

Japanese Application No. 2000-529699, Non-Final Notice of Reasons for Rejection, dated Mar. 2, 2009.

United States Patent and Trademark Office, Office Action, U.S. Appl. No. 10/657,144, mailed Jun. 9, 2009.

Japanese Patent Office, First Office Action, Application No. 2009-209258, dated Apr. 2, 2010.

Japanese Patent Office, First Office Action, Application No. 2010-226893, dated Jan. 7, 2011.

* cited by examiner

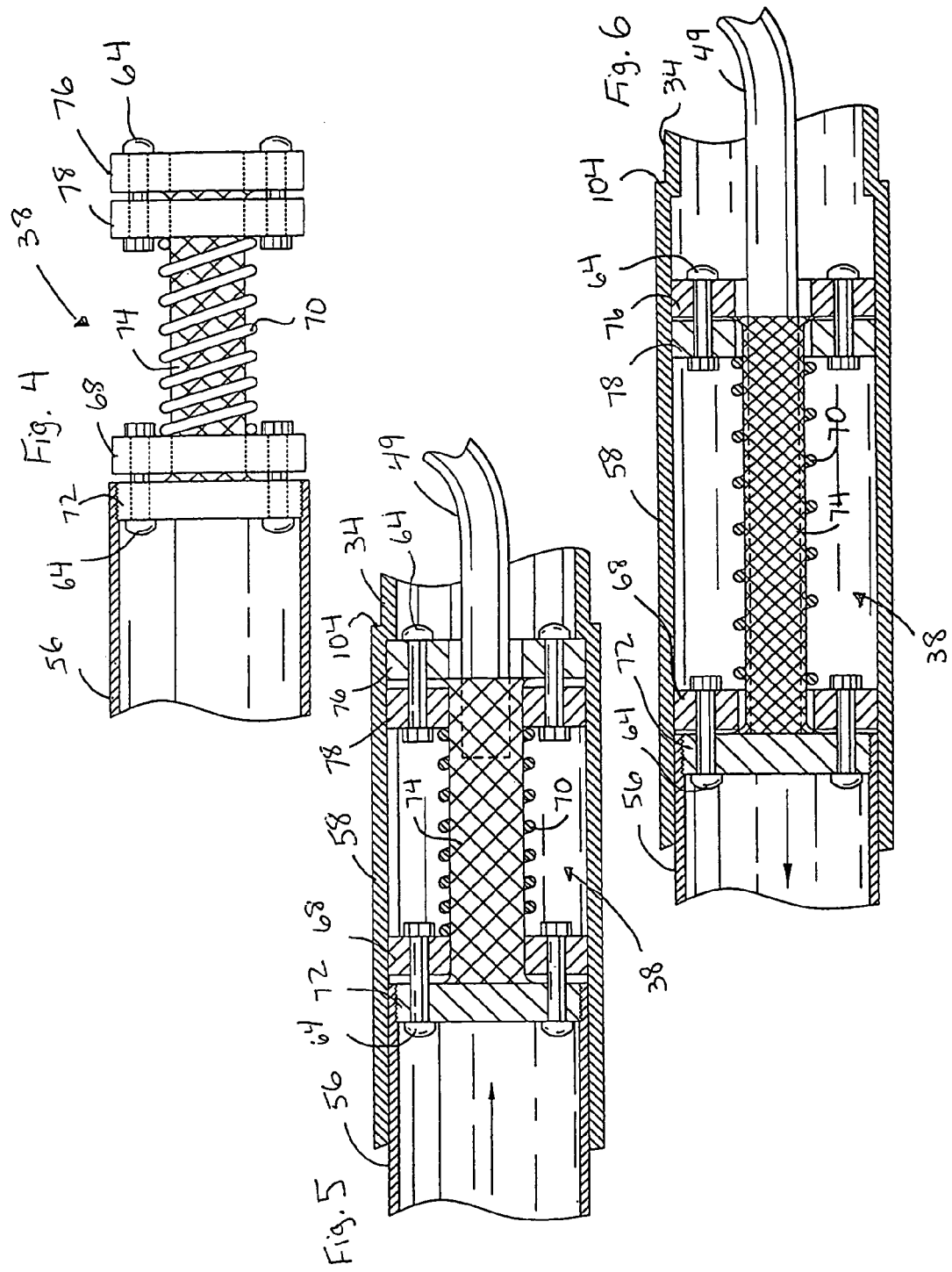

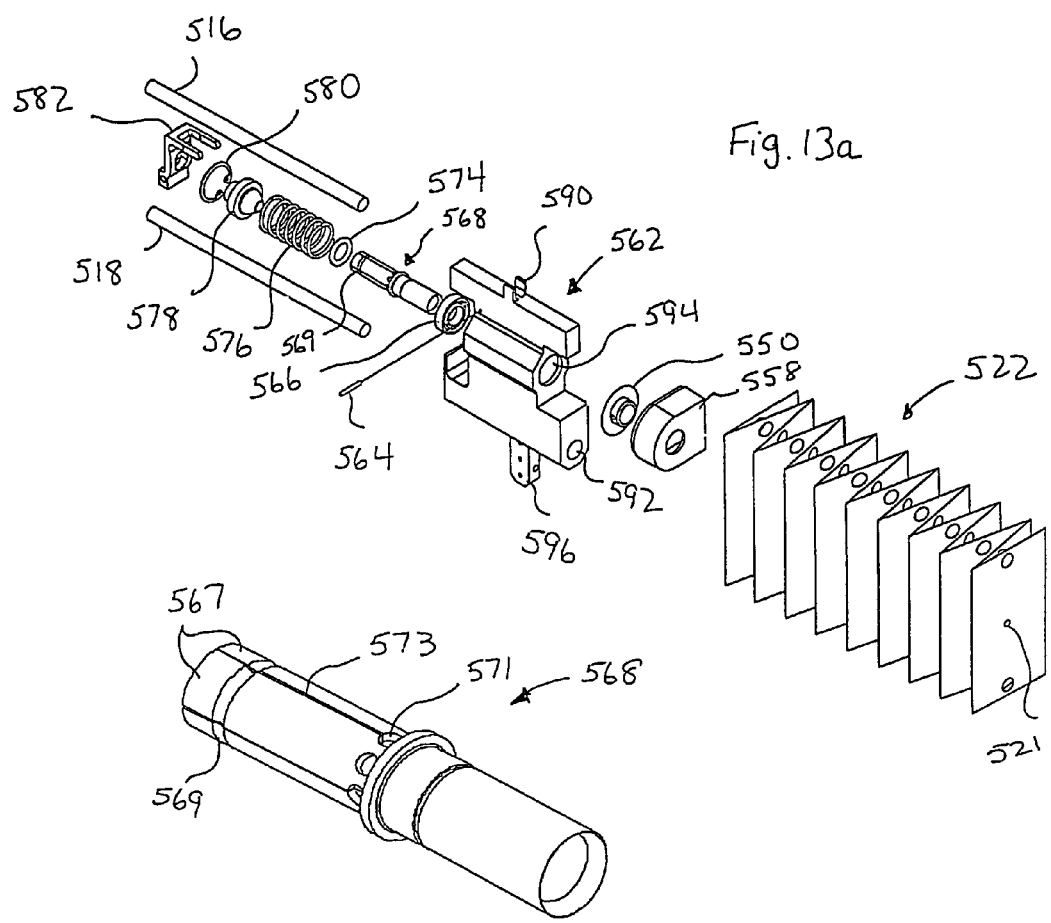

INTERFACE DEVICE AND METHOD FOR INTERFACING INSTRUMENTS TO MEDICAL PROCEDURE SIMULATION SYSTEMS

CROSS-REFERENCE TO RELATED APPLICATIONS

This application is a continuation of U.S. patent application Ser. No. 09/237,969, entitled "Interface Device and Method For Interfacing Instruments To Medical Procedure Simulation Systems", filed Jan. 27, 1999 now U.S. Pat. No. 6,929,481 which is a continuation-in-part of U.S. patent application Ser. No. 08/923,477, filed Sep. 4, 1997 now U.S. Pat. No. 6,106,301 and entitled "Interventional Radiology Interface Apparatus and Method", which claims priority from U.S. Provisional Patent Application Ser. No. 60/025,433, filed Sep. 4, 1996 and entitled "Interventional Radiology Interface Apparatus and Method". In addition, this application claims priority from U.S. Provisional Patent Application Ser. No. 60/072,672, filed Jan. 28, 1998 and entitled "Endoscopic Procedure Simulation System and Method"; from U.S. Provisional Patent Application Ser. No. 60/105,661, filed Oct. 26, 1998 and entitled "Endoscopic Surgical Simulation System and Method Including Pivotable Entry Site"; and U.S. Provisional Patent Application Ser. No. 60/116,545, filed Jan. 21, 1999 and entitled "Endovascular Procedure Simulation System and Method". The disclosures in the above-mentioned patent applications are incorporated herein by reference in their entireties.

BACKGROUND OF THE INVENTION

1. Technical Field

The present invention pertains to computerized simulation systems, generally of the types disclosed in: International Publication Number WO 96/28800, published Sep. 19, 1996 and entitled "Computer Based Medical Procedure Simulation System"; and the above-mentioned patent applications. The disclosure of the above-referenced international publication is incorporated herein by reference in its entirety. In particular, the present invention pertains to an interface device for a computerized medical procedure simulation system, the interface device including peripherals in the form of mock or actual medical instruments for use by a medical practitioner in performing various steps of a medical procedure in order to provide an enhanced realistic simulation of that procedure.

2. Discussion of Related Art

Generally, minimally invasive medical procedures, such as endoscopic or interventional radiological procedures, may be utilized by physicians to accomplish tasks that would otherwise require a patient to undergo open surgery. For example, an angioplasty-balloon procedure may be utilized by physicians to open and eliminate blockages in a blood vessel, while endoscopic procedures may be utilized by physicians to view and/or perform medical procedures on a bodily region of interest.

Performance of minimally invasive medical procedures, such as endoscopic or interventional radiological procedures, requires great skill to avoid complications that may cause serious injury to a patient and/or require the patient to undergo open surgery. For example, in an angioplasty-balloon procedure, the physician is required to navigate a guidewire, catheter and sheath through an arterial network to a blockage point and inflate a balloon to eliminate the blockage, while avoiding a number of possible complications, such as rupturing an artery wall or dissecting the wall of the artery. Thus, physicians need to acquire the necessary skill levels and experience to perform minimally invasive medical procedures in order to ensure successful performance of these types of procedures on patients. Although practicing minimally invasive surgical procedures on live patients provides excellent training, a procedure may usually only be performed once on a particular live patient and typically requires the presence of a skilled physician to supervise and oversee the procedure to avoid serious injury to the patient. Further, training physicians or other medical professionals in minimally invasive surgical procedures on live patients requires the use of proper facilities and equipment (e.g., hospital facilities and equipment), thereby incurring substantial costs and limiting procedure practice to a particular time and location. Moreover, since only one physician is able to practice a procedure on a particular live patient, the quantity of physicians that may practice or perform minimally invasive surgical procedures is severely restricted, thereby limiting the quantity of physicians that may acquire sufficient experience to perform these types of procedures.

The prior art has attempted to overcome the above described disadvantages of utilizing live patients to train physicians or other medical professionals to perform various minimally invasive medical procedures by employing simulation techniques. In particular, U.S. Pat. No. 4,907,973 (Hon) discloses an expert system simulator for modeling realistic internal environments. The simulator may be utilized to simulate an endoscopic procedure, whereby a mock endoscope is inserted and manipulated within a model. The model includes a mock bodily region of interest and a plurality of sensors to detect the position of the endoscope. A computer receives signals from the sensors, and retrieves data from memory in accordance with those signals representing the view observed from the measured endoscope position during a real operation. The data is subsequently shown on a video display, whereby the displayed image is adjusted based on movement of the endoscope within the model. Alternatively, the simulator may be used to simulate an angioplasty-balloon operation, whereby a mock catheter is inserted and manipulated within an internal arterial modeling device. The internal arterial modeling device may include mock arterial paths with sensors to track the progress of the inserted catheter within those paths. A computer retrieves and processes data from storage based on sensor data received from the internal sensors, and sends the processed data to a display that provides a visual display simulating a realistic environment (e.g., a view of the catheter within an arterial network).

U.S. Pat. No. 4,642,055 (Saliterman) discloses a hemodynamic monitoring training system that allows medical professionals to obtain substantial experience in hemodynamic monitoring (e.g., placement of a catheter passed from a distant vein through the heart to the pulmonary vasculature for purposes of measuring intracardiac, pulmonary artery and wedge pressures to determine the type or extent of cardiopulmonary disease, to evaluate therapeutic measures and to monitor cardiac function). The system includes a trainer, computer, display, keyboard and mouse and simulates the catheterization process. A catheter having a balloon disposed at its distal end is inserted within a trainer manikin at a catheter insertion point. The balloon is typically inflated to assist the catheter tip through the heart, and may be inflated in the pulmonary artery to measure wedge pressure. The manikin includes tubes representing veins extending internally from the insertion points, and a position sensor that measures advancement of the catheter tip past the sensor. The sensor data enables the computer to determine the location of the catheter tip within a corresponding actual human body based on catheter manipulation within the trainer manikin. The computer receives signals from the trainer and may provide on the display a simulated fluoroscope image showing simulated movement of the catheter through the heart and vasculature.

The Hon and Saliterman systems suffer from several disadvantages. Specifically, these systems utilize a physical model, thereby restricting training of a medical procedure to a particular bodily region or arterial paths defined by that model. Further, use of physical models degrades realism of the simulation and reduces the benefits of simulation training since the models usually do not contain substantially the same complex anatomy as an actual body, and permit a physician or other medical professional to become accustomed to performing a procedure on the same model anatomy. Performance of the procedure on another bodily region or through different arterial paths within the Hon and Saliterman systems typically requires a new model or substantial modifications to an existing model, thereby limiting flexibility of the systems and increasing system costs. Moreover, the Saliterman system does not provide computer-controlled force feedback to an instrument, thereby degrading realism of the simulation and reducing the benefits of simulation training. In other words, the Saliterman system does not provide a computer simulated feel of forces applied to an instrument during an actual medical procedure.

In order to overcome the disadvantages of utilizing physical models described above, medical procedure simulation systems employ virtual reality technology to simulate performance of a medical procedure on a virtual bodily region of interest. Various types of interface devices are typically utilized by these systems to enable a user to interact with the simulation system. In addition, the interface devices may provide force feedback to the user to simulate the forces encountered during an actual medical procedure. For example, International Publication Number WO 95/02233 (Jacobus et al) discloses a medical procedure simulation system that utilizes virtual reality technology and force feedback to provide an accurate simulation of endoscopic medical procedures. The system includes a display device, sound device, graphics/image processing engine and storage module and programmable tactile/force reflecting mechanisms (e.g., disposed within an interface device) that provide force feedback to generate the "feel" of medical instruments and the interaction of the instruments with an anatomical simulation. Force feedback is typically accomplished by a tactile/force reflecting mechanism via a four axis device that imparts forces and torques to a user's hands through a member representative of a medical instrument in response to manipulation of that member. The forces and torques are applied to the user's hands based on the position of the member in relation to characteristics of a geometric model of an organ or virtual reality simulation of a medical procedure environment. The forces and torques are typically generated by four servomotors that manipulate the member to provide a realistic feel during simulation.

U.S. Pat. No. 5,623,582 (Rosenberg) discloses a human/computer interface tool, typically for use with virtual reality simulation systems. The interface tool preferably interfaces a substantially cylindrical object, such as a shaft of a surgeon's tool, to a simulation system computer such that the computer may generate signals to provide a virtual reality simulation with force feedback applied to the object. The interface tool includes a gimbal mechanism, having two degrees of freedom, coupled to a support, and preferably three electromechanical transducers. The object, when engaged by the gimbal mechanism, may move with three degrees of freedom within a spherical coordinate space, whereby each transducer is associated with and senses a respective degree of freedom of motion of the object. A fourth transducer may be utilized by the interface tool to measure rotation of the object about an axis. Alternatively, the interface tool may accommodate catheter insertion virtual reality systems, typically utilizing catheters having two degrees of freedom of motion, whereby the interface tool includes two transducers that are associated with and sense translation and rotation of a catheter, respectively. The transducers of the interface tool may include actuators to impart a force upon the object to provide force feedback to a user.

U.S. Pat. No. 5,821,920 (Rosenberg et al) discloses an apparatus for interfacing an elongated flexible object with an electrical system including an object receiving portion and a rotation transducer. The rotation transducer determines rotational motion of an elongated object when the object is engaged with the object receiving portion and provides an electrochemical interface between the object and electrical system. The rotation transducer may further include an actuator and translational transducer to further provide a translation electrochemical interface between the object and electrical system. A tandem configuration may be utilized for accommodating a device having an external shaft and an elongated flexible object. This configuration includes first and second object receiving portions that respectively accommodate the external shaft and elongated object. The first and second object receiving portions each have an actuator and translation transducer, whereby a rotation transducer is rotatably coupled to the second object receiving portion. In another embodiment, an object receiving portion may be part of a gimbal apparatus. The transducers of the interface device may be implemented as input transducers for sensing motion, or output transducers for imparting forces onto the elongated object.

U.S. Pat. No. 5,704,791 (Gillio) discloses a virtual surgery system that enables simulation of a surgical procedure using image data of a patient and devices simulating the physical instruments a surgeon utilizes in an actual procedure. Image data, corresponding to a portion of an anatomy in a three dimensional data set, is stored in a memory of a computer, whereby a user input device is used to move through the image data, while the image data is viewed on a display. A virtual surgery may be simulated based on the image data and manipulation of the input device. Further, force feedback may be provided based on physical constraint models or edge and collision detection between a virtual tool and walls or edges of the image data. Moreover, the virtual simulator may be utilized to record data of an actual surgical procedure, or as a remote telesurgery device. In addition, a surgical simulator user input device of the system includes a first virtual scope device attached to an end-portion of a hose that extends into and through a first virtual orifice and a box device. The first virtual orifice is attached at a top portion of the box device and accommodates the hose, while the box device includes an arrangement that handles and may further apply force feedback to the hose. A second instrument is attached to a shaft that extends through a second virtual orifice defined in the first virtual scope device. Signals from the first virtual scope device, the second instrument and/or the first and second virtual orifices are provided to the computer to enable simulation of a surgical procedure.

The virtual reality systems described above suffer from several disadvantages. In particular, the virtual reality systems generally interface an elongated object without utilizing mechanisms to firmly grasp and capture the object, thereby degrading accuracy of object motion measurements. Further, the virtual reality systems generally accommodate a limited quantity of instruments within a nested instrument assembly, and do not permit exchange of instruments during a simulation, thereby reducing the benefits of simulation training since a medical professional may only gain experience for portions of a medical procedure utilizing the accommodated instruments. Similarly, the virtual reality systems generally accommodate either a limited quantity of independently inserted instruments, or a single nested instrument assembly, thereby limiting simulation training to specific procedures or portions of procedures utilizing the accommodated instruments (e.g., the systems generally do not accommodate plural independently inserted nested instrument assemblies, or plural independently inserted instruments where one of the instruments is a nested instrument assembly). Moreover, the virtual reality systems typically include fixed entry sites, thereby limiting the simulated procedure to a particular patient or entry site orientation. In addition, the Jacobus and Rosenberg (U.S. Pat. No. 5,623,582) systems generally employ a plurality of actuators to provide force feedback to a single instrument, thereby increasing system complexity and cost.

Another computer interface device for surgical simulation systems includes the Immersion PROBE produced by Immersion Corporation of Palo Alto, Calif. This interface device includes a pen-like stylus supported on a light-weight mechanical linkage having six degrees of freedom, and reports the position and orientation of the stylus to a computer via a serial port interface. Sensors are disposed at the linkage joints and send spatial coordinates (i.e., X, Y, Z) and orientation (i.e., roll, pitch, yaw) of the stylus to the computer. However, this interface device does not resemble a common medical instrument and does not provide a manner to apply computer controlled force feedback to the interface device, thereby degrading realism of a simulation and reducing benefits of simulation training.

OBJECTS AND SUMMARY OF THE INVENTION

Accordingly, it is an object of the present invention to enhance realism within a medical procedure simulation system by interfacing various peripherals in the form of mock medical instruments to the medical procedure simulation system via an interface device to enable realistic simulation of various aspects of a medical procedure.

It is another object of the present invention to provide enhanced training of a medical procedure to medical practitioners by permitting exchanges of various medical instruments during a simulated medical procedure to enable the medical practitioner to simulate performance of a substantial portion of a medical procedure.

Yet another object of the present invention is to enhance realism within a medical procedure simulation system and to provide enhanced training of a medical procedure to practitioners by interfacing plural independently inserted instruments (e.g., that may include a nested instrument assembly) to the medical procedure simulation system via an interface device to enable realistic simulation of these instruments during a medical procedure.

Still another object of the present invention is to enhance measurement of instrument motion within the interface device by firmly grasping and capturing an instrument via an interface device capture mechanism.

A further object of the present invention is to enhance realism within a medical procedure simulation system and to provide enhanced training of a medical procedure to medical practitioners by enabling a patient entry site to be manipulable to various orientations to permit realistic simulation of medical procedures on patients in different positions.

The aforesaid objects are achieved individually and in combination, and it is not intended that the present invention be construed as requiring two or more of the objects to be combined unless expressly required by the claims attached hereto.

According to the present invention, an interface device and method for interfacing instruments to a medical procedure simulation system, typically including a computer system and display, serve to interface peripherals in the form of mock medical instruments to the medical procedure simulation system computer to enable simulation of medical procedures. The interface device includes a housing having a mock bodily region of interest to facilitate insertion of a mock instrument, such as an endoscope tube, into the interface device via an orifice. The mock bodily region of interest may be pivotable to simulate various patient orientations. The endoscope tube traverses the orifice and a guide tube, and is subsequently engaged by a capture mechanism in order to measure rotational and translational motion of the endoscope tube. The capture mechanism is disposed at the proximal end of an inner tube, disposed in slidable relation within an outer tube, whereby the outer tube receives the endoscope tube from the guide tube. The inner tube distal end is attached to a trolley assembly having a rotational encoder to measure rotation of the inner tube, and hence, the endoscope tube, whereby the trolley assembly is coupled to a belt extending between and about first and second pulleys. A translational encoder is disposed proximate the first pulley to measure pulley rotation based on belt or trolley assembly motion, thereby providing an indication of endoscope tube translational motion. An actuator is disposed proximate the second pulley to impede or enhance pulley rotation and belt or trolley assembly motion, thereby providing force feedback to the endoscope tube. The measured motion is provided to the computer system to reflect instrument motion on the display during the simulation.

Alternatively, the interface device may be configured to measure instrument manipulation via a carrier assembly. The instrument is inserted into the interface device, and extends to the carrier assembly. The carrier assembly includes a rotational encoder having a rotatable shaft that engages the instrument, via a set screw, to measure rotational motion. The carrier assembly is attached to a belt that extends between and about first and second pulleys. A translational encoder is disposed proximate the first pulley to measure pulley rotation based on carrier assembly motion, thereby providing an indication of instrument translational motion. An actuator is disposed proximate the second pulley to impede pulley rotation and belt or carrier assembly motion, thereby providing force feedback to the instrument.

The interface device may further be configured to measure instrument manipulation via a carriage assembly. The instrument is inserted into the interface device and extends through a bellows to the carriage assembly. The bellows includes a series of stabilizer openings to prevent buckling of the instrument. The carriage assembly includes a capture mechanism in the form of a collet assembly to grasp the instrument, and a rotational encoder to measure rotational motion of the instrument. A translational encoder is disposed toward the carriage assembly upper portion proximate an encoder strip to measure translational motion of the carriage assembly, and hence, the instrument translational motion. The carriage assembly is connected to a belt extending between and about first and second pulleys. An actuator is disposed proximate the first pulley to enhance or impede pulley rotation and carriage assembly motion, thereby providing force feedback to the instrument. This configuration may further include a plurality of carriage assemblies to accommodate instrument assemblies having a plurality of nested instruments, whereby each carriage assembly includes a collet assembly of a particular dimension and grasps, measures manipulation of and provides force feedback to a particular instrument as described above. In addition, the interface device may include a plurality of the carriage assembly configurations described above arranged in parallel relation to simultaneously accommodate a plurality of independently inserted instruments.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 4 is a side view in elevation and partial section of an instrument capture mechanism of the interface device of FIG. 3.

FIG. 5 is a side view in elevation and partial section of the instrument capture mechanism of FIG. 4 in an expanded state to receive or release an endoscope navigation tube.

FIG. 6 is a side view in elevation and partial section of the instrument capture mechanism of FIG. 4 in a compressed state to engage an endoscope navigation tube.

FIG. 11a is a side view in elevation and partial section of an interface device for interfacing a catheter to a medical procedure simulation system according to the present invention.

FIG. 11b is a side view in elevation and partial section of a carrier of the interface device of FIG. 11a.

FIG. 13a is an exploded perspective view of a carriage assembly of the interface device of FIG. 12.

FIG. 13b is a perspective view of a collet of the carriage assembly of FIG. 13a.

FIGS. 17a-17b are a side views in elevation and partial section of an interface device configuration of the interface device of FIG. 15 including plural carriage assemblies having an automatic capture and release mechanism according to the present invention.

DESCRIPTION OF THE PREFERRED EMBODIMENTS

Figure 1:
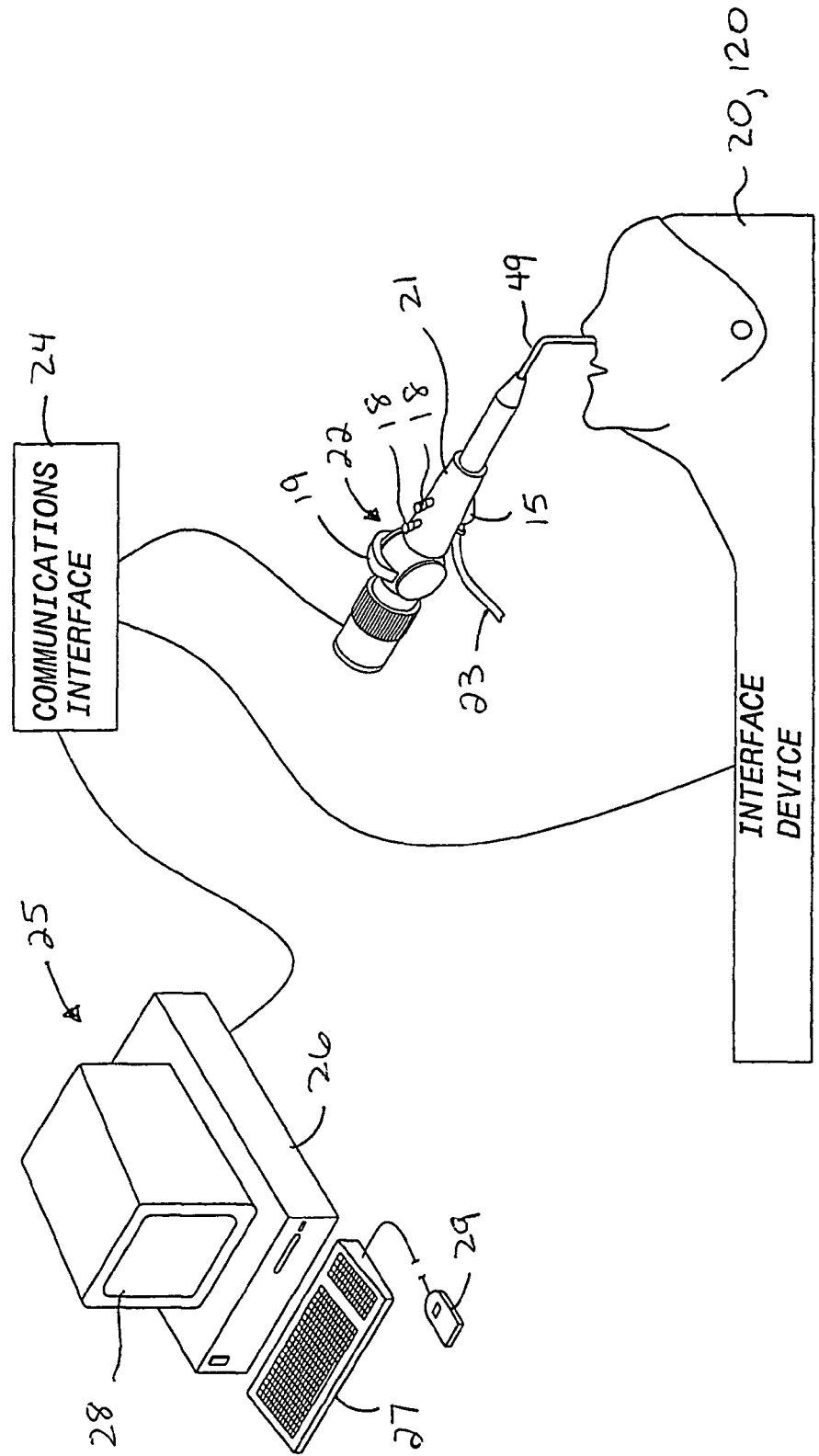
FIG. 1 is a block diagram of a medical procedure simulation system including an interface device according to the present invention.
Figure 2:
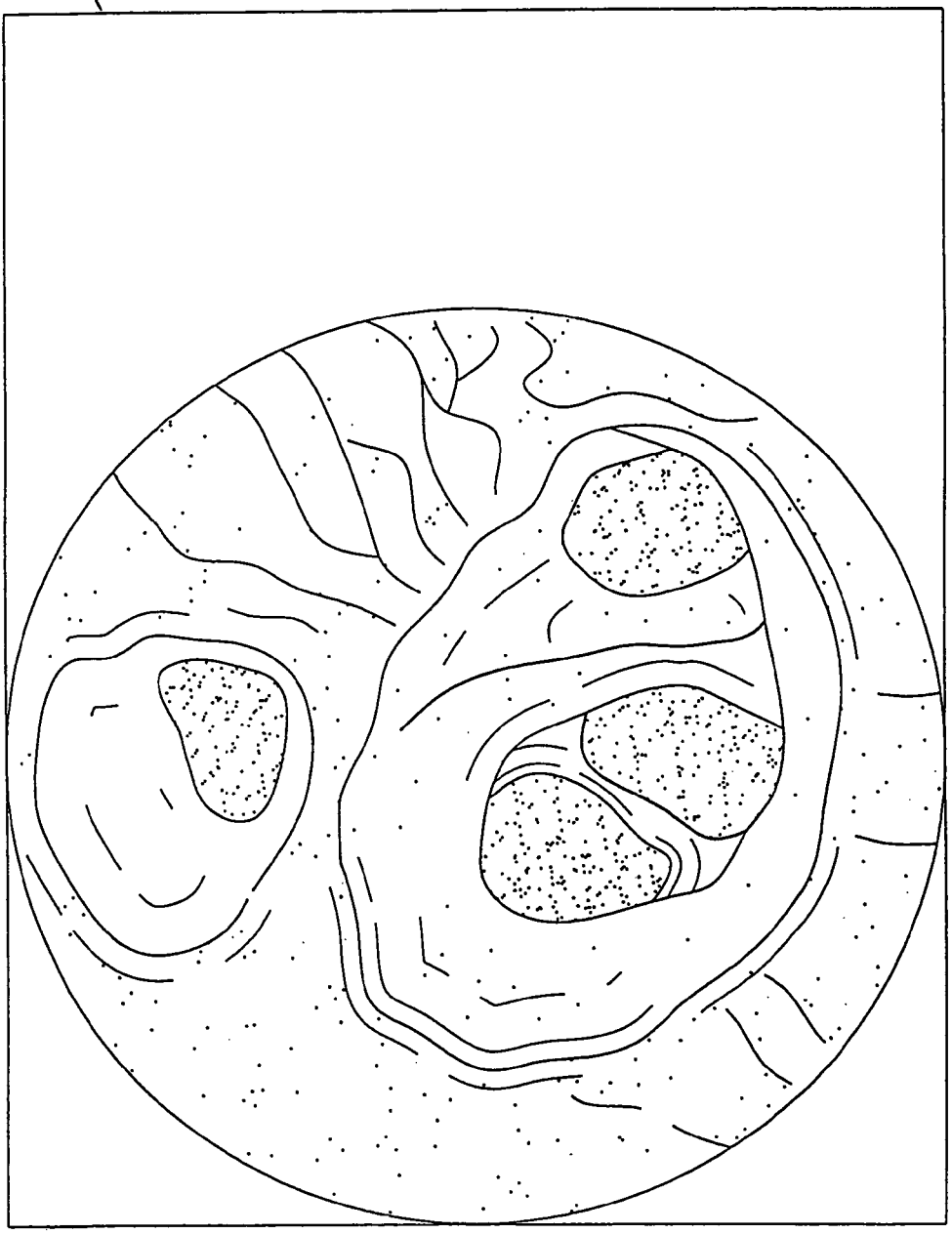
FIG. 2 is a schematic illustration of an exemplary display for the medical procedure simulation system of FIG. 1.

An overall system for simulating medical procedures, preferably endoscopic procedures such as bronchoscopy, laryngoscopy, gastroscopy, colonoscopy, sigmoidoscopy, arthroscopy, laparoscopy or ureteroscopy, is illustrated in FIG. 1. Specifically, the medical procedure simulation system includes a computer system 25, an interface device 20, an actual or mock endoscope 22 and a communications interface 24 for transferring signals between computer system 25, interface device 20 and actual or mock endoscope 22. Computer system 25 preferably includes a monitor 28, base 26 (e.g., including processor(s), memories and accompanying hardware), keyboard 27 and mouse 29, and is typically implemented by a conventional or commercially available workstation, such as those manufactured by IBM, Dell or Silicon Graphics, Inc. The computer system simulates, via software, an endoscopic or other medical procedure (e.g., an interventional radiology procedure), while displaying a simulated particular bodily region of interest (e.g., a tracheobronchial tree having a plurality of segments) on monitor 28. The simulation display preferably emulates an endoscopic video display of an image retrieved by a fiber-optic camera system integrated into an endoscope. An exemplary display of the simulation system showing a tracheobronchial tree is illustrated in FIG. 2.

Interface device 20 includes at least one orifice, such as a simulated nostril, throat, anus, or puncture (as by trocar) etc., for receiving actual or mock endoscope 22. Endoscope 22 typically includes a handle 21, working channel 15, working channel tool 23, thumb lever 19 and switches 18. The endoscope is typically inserted into an interface device orifice and manipulated to perform a simulated endoscopic procedure. Interface device 20 measures manipulation of endoscope 22 and working channel tool 23, and provides signals indicating the measured manipulation to computer system 25. Computer system 25 processes the signals to display, via monitor 28, the internal bodily region of interest (e.g., a tracheobronchial tree as shown in FIG. 2), while adjusting the display to reflect manipulation of endoscope 22 (e.g., including manipulation of switches 18 and thumb lever 19) and working channel tool 23. Computer system 25 further provides force feedback to the endoscope based on manipulation of the endoscope. Communications interface 24 transfers the manipulation and force feedback signals between computer system 25, interface device 20 and endoscope 22.

Working channel tool 23 enables simulation of various devices, such as a needle transbronchial biopsy tool, a grasping bronchial biopsy tool, forceps, laser or other instrument that may be inserted within and manipulated via an endoscope working channel during an endoscopic procedure. The working channel tool is similar to a cable attached to an actual biopsy tool, forceps or transbronchial biopsy tool. A mock endoscope for the simulation system typically contains approximately ten inches of the working channel tool and permits the working channel tool to move within and external of the endoscope approximately three inches, or to be removed entirely and replaced by a different working channel tool. Translational and rotational motion of the working channel tool is generally measured by encoders (not shown) disposed within the endoscope. The working channel may optionally include actuators to provide force feedback to the working channel tools.

Figure 3:
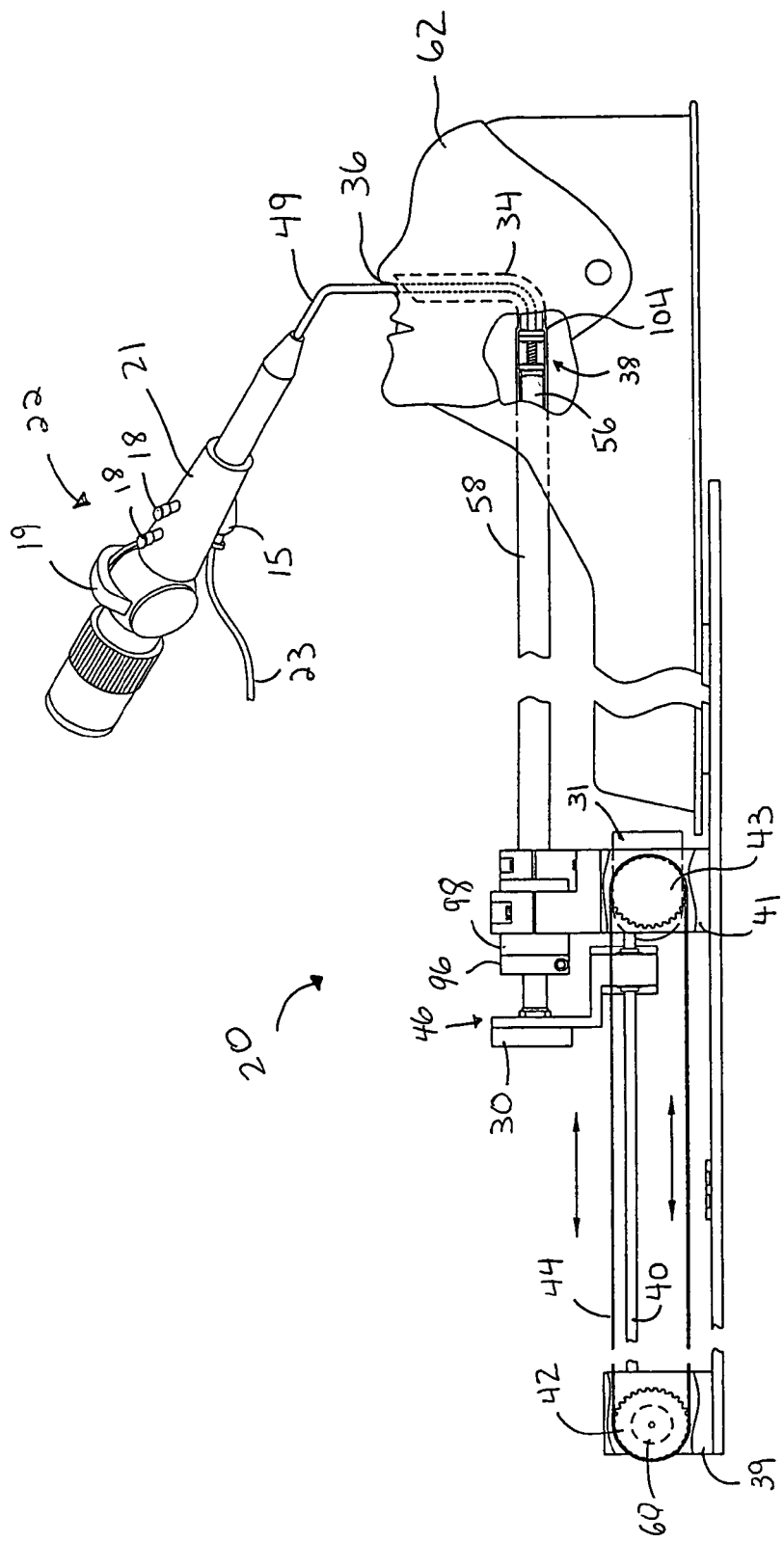
FIG. 3 is a side view in elevation and partial section of the interface device of the medical procedure simulation system of FIG. 1.

An exemplary interface device 20 for the endoscopic procedure simulation system is illustrated in FIG. 3. Specifically, interface device 20 typically includes a mock bodily region of interest having an orifice for receiving an endoscope. By way of example only, the interface device includes a mock head 62 having a nostril 36 for receiving an endoscope 22, typically a bronchoscope. Endoscope 22 includes a navigation tube 49 that is inserted within nostril 36. A guide tube 34 is disposed adjacent nostril 36. The guide tube includes cross-sectional dimensions greater than the cross-sectional dimensions of navigation tube 49 such that the navigation tube extends through guide tube 34 to interface an instrument capture mechanism 38. Guide tube 34 extends from nostril 36 and curves approximately ninety degrees to interface an outer tube 58. Outer tube 58 includes cross-sectional dimensions greater than the cross-sectional dimensions of guide tube 34 such that a step or shoulder 104 is formed at the interface between the outer and guide tubes. An inner tube 56 includes cross-sectional dimensions less than the cross-sectional dimensions of outer tube 58, whereby the inner tube is disposed in slidable relation within the outer tube.

Capture mechanism 38 is disposed toward the proximal end of inner tube 56 and engages navigation tube 49 such that inner tube 56 is translated and rotated based on manipulation of endoscope 22 as illustrated in FIG. 4. Specifically, capture mechanism 38 is disposed toward the proximal end of inner tube 56 and includes disc 72, woven mesh tubular member 74 and substantially annular washers 68, 76, 78. Disc 72 is disposed at the capture mechanism distal end and is attached to washer 68 via fasteners 64, whereby the washer is disposed proximally of the disc. The distal end of woven mesh tubular member 74 is inserted through washer 68 and attached to disc 72. The woven mesh tubular member is typically constructed of spirally wound material and includes expandable and compressed states, whereby the woven mesh tubular member cross-sectional dimensions increase when the member is compressed and decrease when the member is expanded. The proximal end of woven mesh tubular member 74 is inserted through washer 78 and attached to washer 76. Washer 76 is disposed proximally of washer 78 and is connected to washer 78 via fasteners 64. A helical spring 70 is disposed between washers 68, 78 and about woven mesh tubular member 74. The cross-sectional dimensions of the spring are greater than the cross-sectional dimensions of the woven mesh tubular member and openings within washers 68, 78 to permit the spring to enter expanded and compressed states. The spring enables the woven mesh tubular member to enter the compressed and or expanded state in order to vary the tubular member cross-sectional dimensions for engaging and releasing navigation tube 49. In particular, expansion of spring 70 causes woven mesh tubular member 74 to expand, thereby extending the woven mesh tubular member and decreasing the cross-sectional dimensions of that member due to the spiral-shaped nature of the woven mesh material. Conversely, compression of spring 70 decreases the length of woven mesh tubular member 74, thereby increasing the cross-sectional dimensions of the woven mesh tubular member.

The differing cross-sectional dimensions of the woven mesh tubular member enable capture mechanism 38 to securely grasp and release navigation tube 49 without electronic or other mechanical mechanisms as illustrated in FIGS. 5-6. Initially, inner tube 56 is disposed within outer tube 58 with washer 76 positioned adjacent shoulder 104 of outer tube 58 (FIG. 5). Magnets 96, 98 (FIG. 3) are respectively disposed toward the distal ends of the inner and outer tubes to maintain inner tube 56 within outer tube 58 and bias spring 70 to a compressed state. The compressed state of spring 70 causes woven mesh tubular member 74 to enter a compressed state, thereby increasing the woven mesh tubular member cross-sectional dimensions. Navigation tube 49 is inserted into interface device 20 (FIG. 3) through guide tube 34, whereby the increased cross-sectional dimensions of woven mesh tubular member 74 exceeds the cross-sectional dimensions of the navigation tube to permit the navigation tube to enter the capture mechanism. Navigation tube 49 extends through woven mesh tubular member 74 and interfaces disc 72. Additional force applied to the endoscope enables navigation tube 49 to overcome the attraction force of magnets 96, 98 and to move inner tube 56 distally relative to outer tube 58 (FIG. 6). The motion of inner tube 56 enables spring 70 to expand, thereby causing woven mesh tubular member 74 to enter an expanded state with decreased cross-sectional dimensions. The decreased cross-sectional dimensions of the woven mesh tubular member securely grip navigation tube 49 to enable inner tube 56 to be manipulated based on forces applied to endoscope 22.

When navigation tube 49 is removed from interface device 20, inner tube 56 is moved proximally within outer tube 58 to the state where washer 76 contacts shoulder 104 then causing washer 68 to oppose the force of spring 70. The spring subsequently transitions from an expanded (FIG. 6) to a compressed state (FIG. 5) as described above. The compression of spring 70 causes woven mesh tubular member 74 to enter a compressed state, thereby increasing the cross-sectional dimensions of the woven mesh tubular member. The attraction force of magnets 96, 98 maintain inner tube 56 within outer tube 58, thereby maintaining the compressed state of spring 70 and woven mesh tubular member 74. The increased cross-sectional dimensions of woven mesh tubular member 74 exceeds the cross-sectional dimensions of navigation tube 49, thereby enabling the woven mesh tubular member to release the navigation tube to permit removal of the navigation tube from the interface device.

Referring back to FIG. 3, the distal end of inner tube 56 is connected to a trolley assembly 46 that enables measurement of translational and rotational motion of navigation tube 49 via sensed motion of inner tube 56. Trolley assembly 46 is attached to a belt 44 that extends between and about a pair of pulleys 42, 43 disposed on corresponding supports 39, 41. Supports 39, 41 are separated by a distance similar to the length of inner tube 56, and include guide rails 40 extending between the supports with belt 44 disposed between the guide rails. Trolley assembly 46 includes openings defined in the trolley assembly portion adjacent belt 44 for receiving guide rails 40 to direct trolley assembly motion. A rotation encoder 30 is disposed on the trolley assembly and includes a shaft that interfaces the distal end of inner tube 56 to measure rotational motion of navigation tube 49, while a translation encoder 31 is disposed on support 41 to interface pulley 43 and measure translational motion of the navigation tube. In particular, once navigation tube 49 interfaces capture mechanism 38, additional translational force applied to the endoscope (e.g., motion of the navigation tube into simulated lungs) enables inner tube 56 to slide relative to outer tube 58, thereby causing trolley assembly 46 to move along guide rails 40. The trolley assembly motion manipulates belt 44 about pulleys 42, 43, thereby causing the pulleys to rotate. Rotation of pulley 43 is measured by translation encoder 31 to provide an indication of translational motion of the navigation tube into or out of the lungs, stomach, colon, etc. Further, rotational motion of navigation tube 49 causes inner tube 56 to rotate, thereby enabling rotation encoder 30 to measure the navigation tube rotation. The capture mechanism secures navigation tube 49 to inner tube 56 such that rotation of the navigation tube causes rotation of inner tube 56. Rotation and translation encoders 30, 31 essentially generate signals that are sent to communications interface 24 (FIG. 1). The communications interface includes a processor or other circuitry to determine respective encoder pulse counts and provide signals to computer system 25 indicating rotational and translational motion of the navigation tube. Computer system 25 processes the pulse counts to enable simulation of navigation tube rotation and translation.

During an actual procedure, a medical practitioner is able to view the inside lumen or other interior region of the bodily cavity. For example, a bronchoscope may be inserted into a nasal opening and extend into the lungs. A medical practitioner typically manipulates the bronchoscope in its degrees of freedom (e.g., translational, rotation and flexion of the bronchoscope distal tip) to safely navigate down a lumen or opening in branches of a bronchial tree. However, during navigation, the bronchoscope typically encounters bifurcations (e.g., the bronchial tree bifurcates into various lobes, segments and sub-segments) and may contact walls of the bronchi, whereby the medical practitioner feels forces on the bronchoscope. This generally occurs when the medical practitioner fails to steer down the center of one of the paths of the lung bifurcations, thereby contacting the bronchial wall at the bifurcation. In order to simulate those or other forces encountered during an actual procedure, a force feedback unit 60 is employed within the interface device. Specifically, force feedback unit 60 is disposed on support 39 adjacent pulley 42 to impart forces encountered during an actual procedure, such as touching lung walls or bronchial walls at a bifurcation during a bronchoscope examination. Force feedback unit 60 is typically implemented by an electromagnetic device and receives control signals from computer system 25 via communications interface 24. Computer system 25 determines, based on manipulation of the endoscope, the feedback force to apply, and sends control signals to communications interface 24. The communications interface includes digital to analog converters (DAC) and converts the computer system control signals to analog signals in order to transmit the signals to the interface device to control force feedback unit 60. The force feedback unit imparts a magnetic force on pulley 42 to impede or enhance pulley rotation and trolley assembly motion. The impeded motion requires additional force to be applied to the endoscope to overcome the magnetic force, while enhanced motion requires application of less force, thereby providing a realistic feel to the endoscopic procedure.

In addition, thumb lever 19 of endoscope 22 may be utilized to simulate flexing or bending of the navigation tube distal end. Specifically, the endoscope typically includes an encoder (not shown) to measure manipulation of thumb lever 19 and provide a signal to computer system 25, via communications interface 24, in substantially the same manner described above for the rotation and translation encoders. Manipulation of the thumb lever enables simulation of virtual camera motion at the distal end of the endoscope. The thumb lever may optionally include adjustable frictional resistance using any one of a number of damping mechanisms, and additionally may include computer controlled force feedback via an actuator (not shown). Switches 18 of endoscope 22 may be used to simulate irrigation with fluids, suction of the fluids from the lungs and to control a simulated recording system that may capture video and/or still images from the monitor system. The switches provide signals to computer system 25, via communications interface 24, to enable the computer system to perform the desired simulation.

Operation of the medical procedure simulation system to simulate an endoscopic procedure is described, by way of example only, with reference to FIGS. 1 and 3. Specifically, a medical practitioner or user manipulates an endoscope 22, such as a bronchoscope, and inserts navigation tube 49 into a bodily opening or nostril 36 of mock head 62. The endoscope is typically manipulated in a manner similar to that utilized during an actual procedure. Generally, the endoscope is held in one hand, while the other hand manipulates the navigation tube. Navigation tube 49 traverses guide tube 34 and interfaces capture mechanism 38. The capture mechanism engages navigation tube 49 as described above. Once navigation tube 49 engages the capture mechanism, inner tube 56 and navigation tube 49 are effectively mated such that translational and rotational motion of the distal tip of navigation tube 49 within the virtual patient is reflected by inner tube 56.

The translational and rotational motion of inner tube 56, and hence, navigation tube 49, is measured to enable computer system 25 to simulate the movement of the endoscope within a virtual patient (e.g., the distance the navigation tube has been inserted into the virtual patient and rotation of the navigation tube). As navigation tube 49 is inserted into or withdrawn from interface device 20, the navigation tube applies force to inner tube 56 via capture mechanism 38. The inner tube translational motion moves trolley assembly 46 between supports 39, 41, thereby causing belt 44 to rotate pulleys 42, 43. Translation encoder 31 attached to pulley 43 measures pulley rotation and provides a signal to computer system 25, via communications interface 24, indicating translational motion of the navigation tube. Rotational motion of the navigation tube causes inner tube 56 to rotate via capture mechanism 38. Inner tube 56 is coupled to rotation encoder 30 disposed on trolley assembly 46 such that the rotation encoder measures rotational motion of the inner tube. The rotation encoder provides a signal to computer system 25, via communications interface 24, indicating the rotational motion of navigation tube 49. In addition, force feedback unit 60, coupled to pulley 42, may be energized to provide force feedback to the endoscope when computer system 25 determines that the navigation tube has encountered an obstacle, such as a lung wall. The force feedback unit applies magnetic forces to impede or enhance rotation of pulley 42, and hence, motion of the belt and trolley assembly, thereby respectively requiring additional or less force to be applied to manipulate the navigation tube and imparting a realistic feel to the simulation.

Simulation of flexing the distal end of navigation tube 49 is accomplished via manipulation of thumb lever 19 of endoscope 22. The motion of the thumb lever is measured by an encoder (not shown), typically disposed within endoscope handle 21, that provides a signal to computer system 25, via communications interface 24, indicating the motion of the thumb lever. Computer system 25 processes the signal to determine flexing of the tube and a resulting simulated image produced from a camera based on the position of the flexed tube.

Once the endoscope is placed within the lungs of the simulated patient as described above and viewed on monitor 28, the medical practitioner may perform a simulated biopsy. The biopsy is typically performed by an assistant upon verbal command during an actual procedure, however, the simulated biopsy is performed by computer system 25 as described below. Initially, a biopsy tool is selected, via computer system 25, and working channel tool 23 is inserted into the endoscope and manipulated by the user to perform the biopsy. As working channel tool 23 is extended into the working channel of endoscope handle 21, computer system 25 displays simulated extension of the biopsy tool from the endoscope working channel (e.g., up to several centimeters beyond the distal end of the navigation tube). The working channel tool is typically shown in the simulated visual field of the simulated fiber-optic camera. The medical practitioner continues to manipulate the working channel tool to position the tool adjacent lung tissue of the simulated patient. Once the tool is positioned, the medical practitioner commands computer system 25, via keyboard 27, to take a sample. Computer system 25 proceeds to open and close biopsy forceps to simulate taking of a biopsy from lung tissue. Thus, the simulated procedure is similar to an actual procedure whereby an endoscope with a fiber optic camera at its distal tip is simulated by computer system 25 based on manipulation of endoscope 22 within interface device 20.

Figure 7:
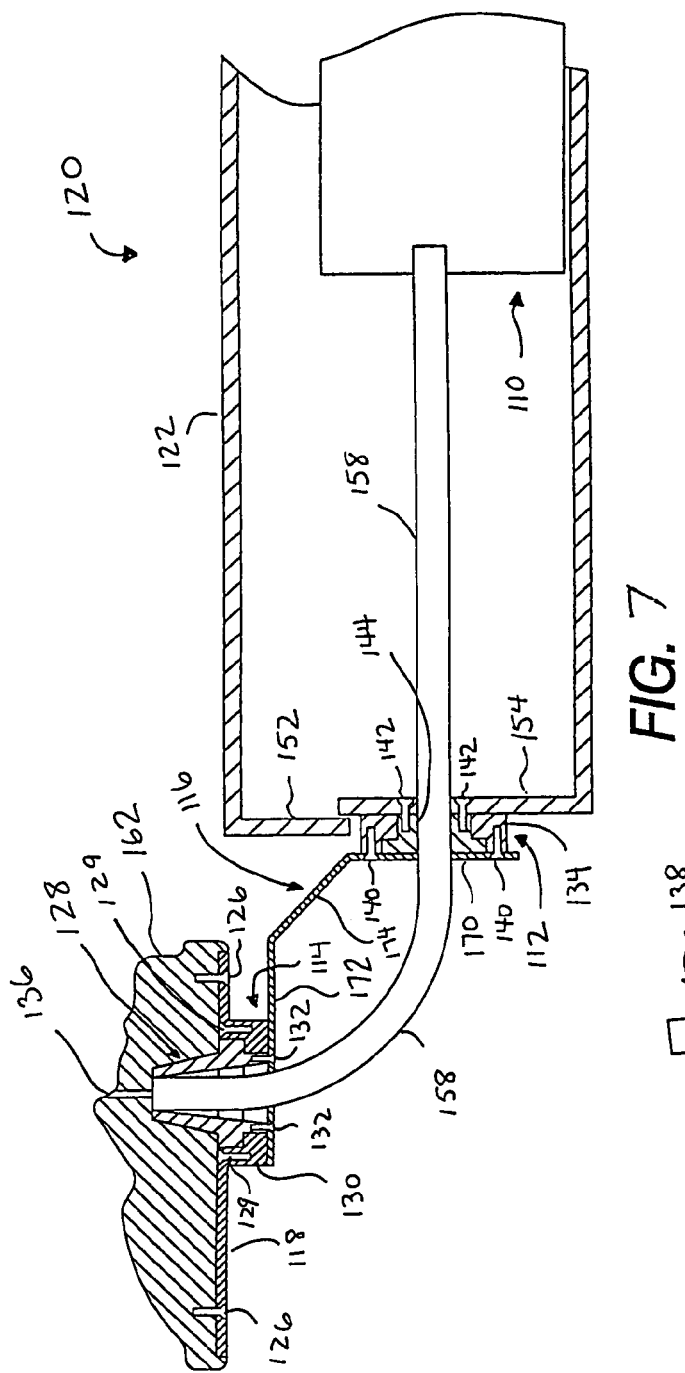
FIG. 7 is a side view in elevation and partial section of a medical procedure simulation system interface device including a pivotable entry site according to the present invention.

The interface device may further be configured to include pivoting mechanisms to pivot a mock bodily region of interest, such as a head, to various positions and/or orientations as illustrated in FIG. 7. Interface device 120 is substantially similar to interface device 20 described above, except that interface device 120 includes mechanisms to enable the mock bodily region of interest to pivot. Interface device 120 measures manipulation of and provides force-feedback to an instrument, such as endoscopic navigation tube 49 (FIG. 1) inserted within the interface device during simulation of a medical procedure in substantially the same manner described above. Specifically, interface device 120 includes a housing or case 122, a mock anatomical site 162, such as a head, an angle bracket or support 116 for supporting head 162 and pivoting mechanisms 112, 114 for enabling head 162 to pivot relative to housing 122 and support 116, respectively. Housing 122 includes front, rear and side walls that collectively define a housing interior. The interface device front wall is typically formed of overlapping sections, such as an upper section or overhang 152 and a lower section or flange 154. Sensing and force-feedback assembly 110 is disposed within housing 122 for measuring manipulation of and providing force-feed-back to endoscope navigation tube 49 during simulation of a medical procedure. The sensing assembly includes substantially the same components and functions in substantially the same manner as the interface device components described above to measure navigation tube manipulation and provide force-feedback. Mock head 162 includes a nostril or orifice 136 that serves as an entry site for receiving the endoscope navigation tube.

Angle bracket 116 is attached to lower section or flange 154 of the interface device front wall. The angle bracket includes an interface section 170 that is attached, via pivoting mechanism 112, to the interface device front wall, an anatomical site section 172 that supports head 162, and an angled section 174 that extends between the interface and anatomical site sections at an angle relative to each of those sections. However, the angle bracket sections may be connected at any desired angle. Mock head 162 is affixed to a backing plate 118 via fasteners 126. Plate 118 is attached to pivoting mechanism 114 to enable head 162 to pivot relative to angle bracket 116. Specifically, pivoting mechanism 114 includes a ring 130 rotatably coupled to a fixed, substantially conical retainer 128. The ring is coupled to backing plate 118 by fasteners 129 and is retained by conical retainer 128, which is in turn affixed to angle bracket 116 via fasteners 132. The ring may include any conventional pivoting and/or locking arrangements, but preferably includes a spring-loaded ball bearing for interfacing detents defined in the ring surface to enable the plate and ring to rotate and place head 162 in various positions and orientations relative to the angle bracket.

Pivoting mechanism 112 is disposed between angle bracket 116 and the interface device front wall. Pivoting mechanism 112 provides an additional degree of freedom for mock head 162 substantially orthogonal to the degree of freedom provided by pivoting mechanism 114. Pivoting mechanism 112 includes a ring 134 that is rotatably coupled to a fixed, substantially annular retainer 144 and attached to angle bracket 116 via fasteners 140. The retainer is attached to the lower section or flange 154 of housing front wall via fasteners 142. Ring 134 is substantially similar to ring 130 of pivoting mechanism 114, and enables the angle bracket to pivot relative to housing 122. Ring 134 may include any conventional pivoting mechanisms, but preferably includes a spring-loaded ball bearing for interfacing detents defined in the ring surface to enable the angle bracket to rotate and place head 162 at various positions and orientations relative to housing 122. In addition, a further locking mechanism (not shown) utilizing pressure and/or frictional forces to prevent rotation via ring 134 may be employed to maintain head 162 at a particular orientation relative to housing 122.

An outer tube 158 extends from nostril 136 through pivoting mechanism 114 (e.g., retainer 128 and ring 130) and angle bracket 116 and curves toward pivoting mechanism 112 disposed on flange 154 of interface device front wall. Outer tube 158 extends from the curved portion through pivoting mechanism 112 (e.g., retainer 144 and ring 134) and angle bracket 116 into the housing interior to sensing assembly 110. Outer tube 158 is similar to and performs the functions of the outer and guide tubes described above. The outer tube is rotatable about its longitudinal axis via pivoting mechanism 112 (e.g., retainer 144 and ring 134), whereby the interior of conical retainer 128 surrounds and forces the outer tube to rotate relative to the housing when head 162 is pivoted via pivoting mechanism 112.

Figure 8:
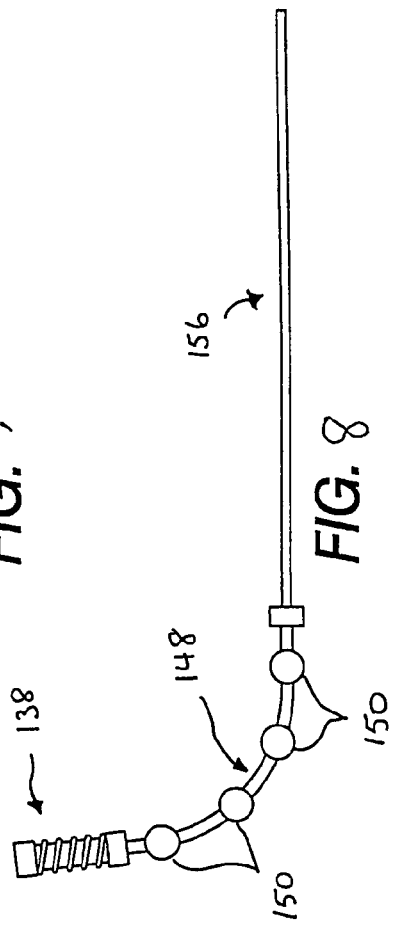
FIG. 8 is a view in elevation of an interface device motion communication tube including an instrument capture mechanism according to the present invention.

In order to sense endoscope tube manipulation, an inner tube 156 is disposed within outer tube 158 to capture and emulate endoscope navigation tube motion as illustrated in FIG. 8. Specifically, inner tube 156 includes cross-sectional dimensions less than the cross-sectional dimensions of outer tube 158, whereby the inner tube is disposed in slidable relation within the outer tube. A flexible torsion tube 148 is disposed at the proximal end of the inner tube, while an instrument capture mechanism 138 is disposed at the proximal end of torsion tube 148. A plurality of substantially annular spacers 150 are disposed about the torsion tube between the inner tube and capture mechanism. The spacers are configured to maintain the torsion tube at the approximate center of outer tube 158, while still permitting the torsion tube to flex within the outer tube. Capture mechanism 138 is substantially similar to the instrument capture mechanism described above. Inner tube 156 is initially positioned within outer tube 158 such that torsion tube 148 flexes to traverse the outer tube curved portion and position the capture mechanism adjacent nostril 136. When an endoscope navigation tube is inserted into the nostril, mechanism 138 captures the tube, thereby enabling inner tube 156 to emulate the endoscope navigation tube manipulation and facilitate measurement of that manipulation via sensing assembly 110 in substantially the same manner described above.

Pivoting mechanisms 112, 114 provide degrees of freedom that enable mock head 162 to be pivoted or rotated into various desired or appropriate positions for simulation. For example, mock head 162 may be pivoted to a position as shown in FIG. 7, thereby simulating a patient lying on their back. Further, head 162 may be pivoted from the patient back lying position approximately ninety-degrees relative to housing 122, via mechanism 112, to simulate a patient lying on their side. Moreover, head 162 may be pivoted from the patient side lying position approximately ninety-degrees relative to the angle bracket, via mechanism 114, to simulate a seated patient, while mechanism 112 may further enable pivoting of head 162 to simulate a partially reclined seated patient. Thus, mock head 162 can be pivoted into multiple positions via mechanisms 112, 114 that provide substantially orthogonal degrees of freedom.

Operation of interface device 120 is described with reference to FIGS. 1, 7-8. Initially, head 162 is manipulated via mechanisms 112, 114 to any desired position or orientation suitable for a particular simulation. The medical procedure simulation system subsequently performs a simulation in substantially the same manner described above. Specifically, a medical practitioner or user manipulates an endoscope 22 and inserts navigation tube 49 into a bodily opening or nostril of mock head 162. Navigation tube 49 interfaces capture mechanism 138, thereby enabling inner tube 156 to reflect translational and rotational motion of the navigation tube. Sensing assembly 110 measures the manipulation of the navigation tube and provides information to computer system 25 via communications interface 24 to enable simulation of force-feedback and traversal of the endoscope within a virtual patient.

Endovascular procedures generally require a medical practitioner to guide instruments through a patient vascular system (e.g., including arteries and veins) to access a remote site of interest where the instruments are utilized. The remote site may be located within or adjacent a vein or artery, or may be located within the heart itself (e.g., during procedures of heart valve repair or heart pacing leads placement or manipulation).

Generally, an endovascular procedure utilizes a variety of navigation and/or other instruments or devices that are inserted into a patient body (e.g., through a vein) and navigated, via the use of a fluoroscope display, to the site of the actual repair or intervention. By way of example, a procedure may utilize a hollow sheath having a length of a few centimeters and including a tapered, solid dilator that provides a conical tip for the sheath assembly. The sheath provides an opening into a vein or artery, whereby the dilator is removed from the sheath lumen and replaced by a catheter that is inserted into the sheath and manipulated through the vein or artery based on a fluoroscope display to a site of interest. A guidewire may be inserted into the catheter to extend beyond the catheter tip for navigation around difficult passages in the patient vascular tree. The catheter may then be navigated by the wire through the difficult passage.

During the procedure, the guidewire may be replaced by a more flexible or differently shaped wire to maneuver around difficult anatomy, whereby a combination of the wires and catheter may be utilized to reach a particular site. Additional instrument exchanges may be employed for performing various functions. For example, a catheter having an angioplasty balloon may be utilized as a surgical plaque removal device to alleviate circulation blockages due to plaque. Alternatively, a stent may be deployed via a special catheter to maintain a blood vessel in an open state or, where rupture is possible due to an aneurysm, a stent graft may be deployed by the special catheter to both stabilize and reinforce the blood vessel at the potential rupturing point.

During each procedure, the medical practitioner is required to control the depth (e.g., translational) and rotational orientation of the tips of several mutually co-axial instruments in order to successfully complete that procedure. However, long flexible instruments (e.g., catheters, guidewires, etc.) exhibit torsional, compressive and tensile strain of varying degrees, thereby preventing accurate determination of the orientation of the instrument distal end based on observation of the instrument proximal end. In other words, the distance the instrument is inserted within the body and the angle of rotation of the instrument distal end are frequently a function of a large quantity of variables, such as the materials constructing the instrument, the portion of the instrument disposed within the patient body, and the forces encountered by the instrument.

Figure 9:
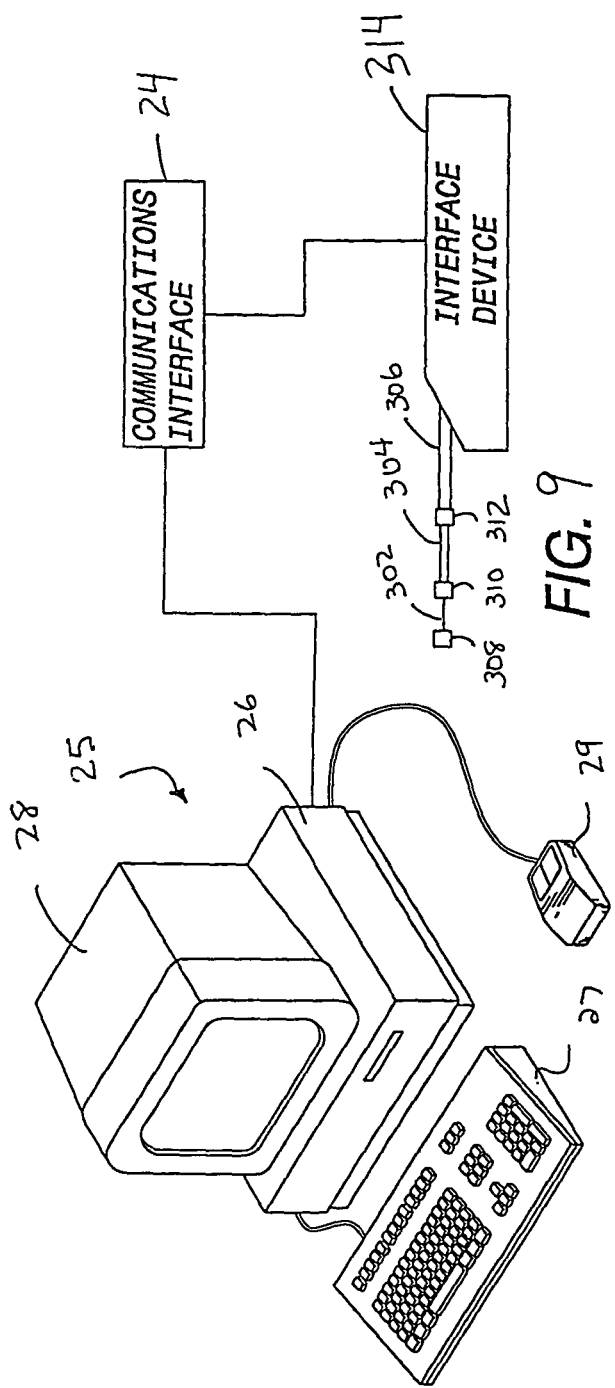
FIG. 9 is a block diagram of the medical procedure simulation system of FIG. 1 having an interface device accommodating a wire, catheter and sheath according to the present invention.

In order to accommodate endovascular procedures, the interface device may alternatively be configured to measure motion of a plurality of instruments at their respective distal tips, and enable the instruments to be exchanged in any desired order during a simulated procedure as illustrated in FIG. 9. The medical procedure simulation system preferably simulates endovascular procedures and is similar to the system described above for FIG. 1, except that the system of FIG. 9 includes interface device 314. Specifically, the medical procedure simulation system includes computer system 25, interface device 314 and communications interface 24 for transferring signals between computer system 25 and interface device 314. The computer system and communications interface are substantially similar to, and function in substantially the same manner as, the computer system and communications interface described above. The simulation system simulates, via software, an endovascular or other medical procedure, while displaying a simulated bodily region of interest (e.g., the system includes models of the vascular system) on monitor 28. Interface device 314 accommodates an actual or mock wire 302 optionally having a handle 308, an actual or mock catheter 304 optionally having a handle 310, and an actual or mock sheath 306 optionally having a handle 312. The wire, catheter and sheath are nested and are partially disposed within the interface device. The interface device measures manipulation of the wire, catheter and sheath, and provides signals indicating the measured manipulation to computer system 25 via communications interface 24. Computer system 25 processes the signals to display, via monitor 28, the internal bodily region of interest, while adjusting the display (e.g., vascular models) to reflect manipulation of the wire, catheter and sheath. In addition, interface device 314 may provide force feedback to the wire, catheter and sheath (e.g., oppose or enable rotational and/or translational motion of these instruments) in accordance with control signals from the computer system to simulate the forces encountered during an actual procedure. Communications interface 24 transfers the manipulation and force feedback signals between computer system 25 and interface device 314 in substantially the same manner described above. It is to be understood that the interface device may interface various instruments (e.g., endoscopes, tubes, navigation instruments, etc.) to a simulation system to simulate a variety of medical procedures in substantially the same manner described below.

Figure 10:
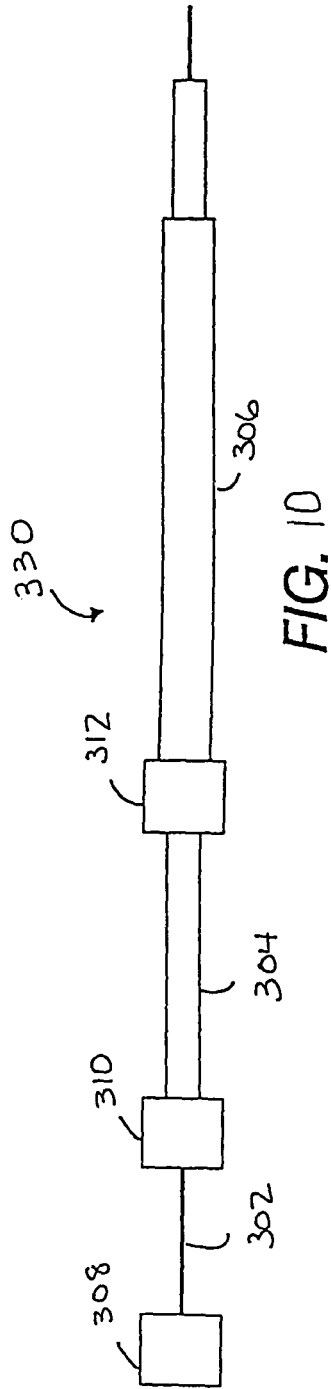
FIG. 10 is a side view in elevation of an exemplary wire, catheter and sheath assembly.

An exemplary instrument assembly for use in an interventional radiology procedure and for interfacing computer system 25 via interface device 314 is illustrated in FIG. 10. Specifically, an assembly 330 includes wire 302, catheter 304 and sheath 306. Catheter 304 is disposed within and extends beyond the sheath proximal and distal ends, while wire 302 is disposed within and extends beyond the catheter proximal and distal ends. This nested arrangement enables independent manipulation of the instruments in order to navigate within a patient and utilize tools or other implements disposed at the distal ends of the instruments, such as a balloon or other implement. The proximal portions of the wire, catheter and sheath are each located external of the interface device, and each of these instruments may include a corresponding handle 308, 310, 312 disposed toward their proximal end to enable manipulation of that instrument. The distal portions of the instruments are similarly nested to enable the interface device to measure manipulation of and apply force feedback to a particular instrument.

Figure 11:
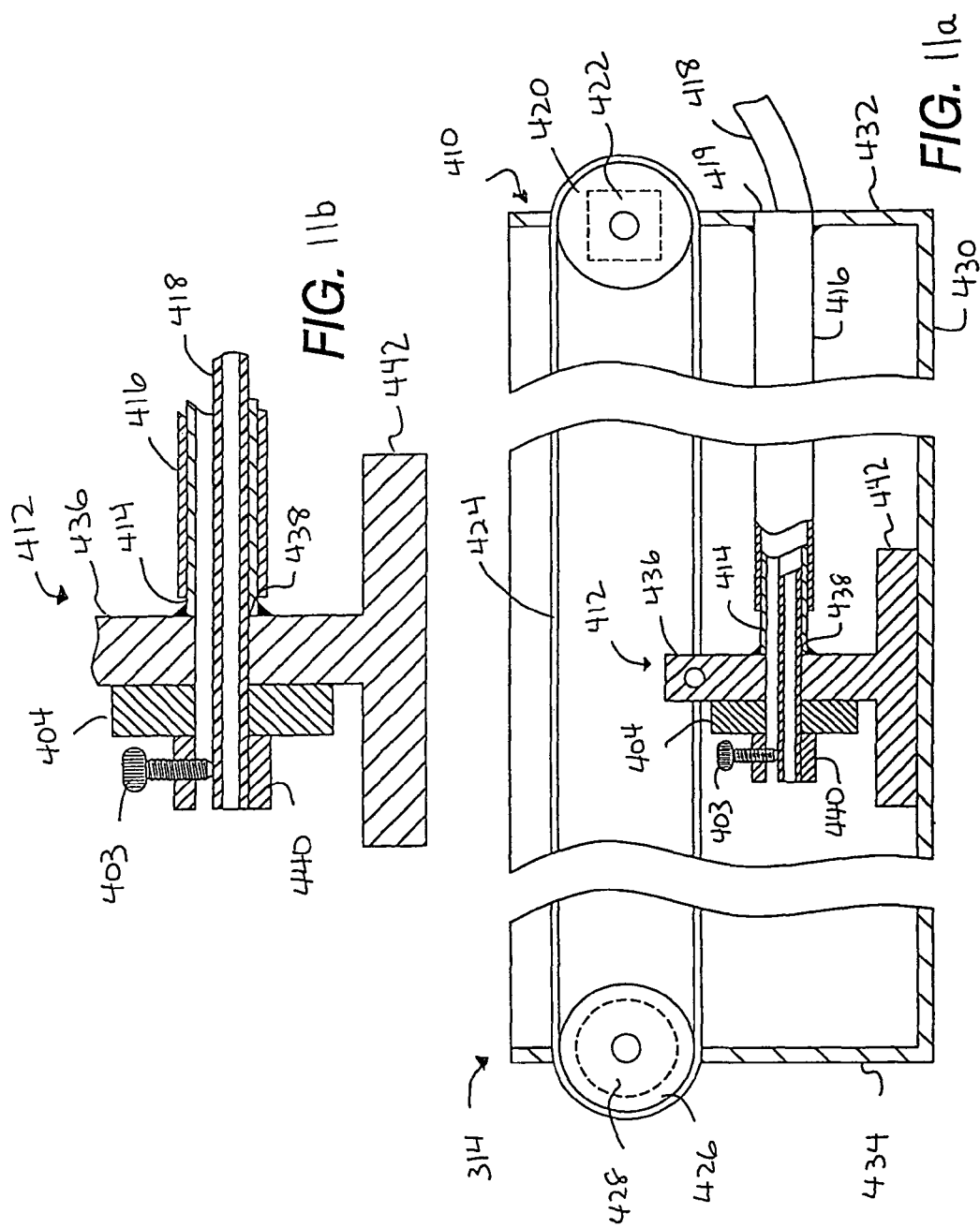

An exemplary interface device for measuring manipulation of and providing force feedback to a catheter is illustrated in FIG. 11a. Specifically, interface device 314 includes a frame 410 having a base 430 and supports 432, 434, and a carrier assembly 412 disposed between the supports. Support 432 extends from the proximal end of, and substantially perpendicular to, the base, while support 434 extends from the distal end of the base substantially parallel to support 432. An outer tube 416 is attached to frame 410 and extends from support 432 toward carrier assembly 412, while an inner tube 414 is disposed within the outer tube and extends beyond the outer tube distal end to the carrier assembly. The outer tube includes cross-sectional dimensions greater than the cross-sectional dimensions of the inner tube such that the inner and outer tubes are in slidable relation. The proximal end of outer tube 416 is disposed within an opening or orifice 419 defined in support 432 for receiving a distal end of a catheter 418. Since the catheter is flexible, the catheter tends to buckle under compressive stress induced by translational motion of the catheter into the interface device. However, the combination of the slidable inner tube and outer tube provide a telescoping action that stabilizes the catheter and prevents buckling.

Support 432 further includes a pulley 420 disposed toward the support upper portion and a corresponding conventional encoder 422. The encoder may be directly attached to the pulley, but is preferably attached to the pulley via a shaft (not shown). Similarly, support 434 includes a pulley 426 disposed toward the support upper portion and a corresponding actuator 428. The actuator may be directly attached to pulley 426 or be attached via a shaft (not shown). A belt 424 is disposed about each pulley 420, 426 and extends between the supports, whereby the upper portion of the carrier assembly is connected to the belt.

Referring to FIG. 11b, carrier assembly 412 includes a platform 442 and a carrier support 436 extending from the approximate center of and substantially perpendicular to the platform. The platform bottom may include wheels or other devices (e.g., guide rails, tracks, etc.) enabling movement of the carrier along the platform. An opening 438 is defined in the carrier support, whereby inner tube 414 is attached to the carrier support coincident the opening to enable catheter 418 to extend through that support. A carrier encoder 404, preferably conventional, is disposed proximate the carrier support opening and includes a tubular shaft 440 to receive the catheter. The catheter extends through the encoder tubular shaft, whereby the shaft includes a set screw 403 to firmly grasp the distal end of the catheter.

Operation of interface device 314 is described with reference to FIG. 11a. Specifically, catheter 418 is inserted into orifice 419 and manipulated by a user to traverse the outer and inner tubes to carrier assembly 412. The catheter further extends through the carrier support opening and encoder shaft, whereby the catheter is firmly engaged by set screw 403. Once the catheter is engaged, further insertion of the catheter into the interface device by the user causes the carrier assembly to move toward support 434. Conversely, force applied to remove the catheter from the interface device causes the carrier assembly to move toward support 432. The carrier assembly motion enables belt 424 to traverse and rotate pulleys 420, 426. Encoder 422 measures the rotational motion of pulley 420, and hence, the translational motion of the catheter, and provides a signal to the computer system via the communications interface. Rotational motion of the catheter enables tubular shaft 440 to rotate since the catheter is connected to the shaft via set screw 403. Encoder 404 measures the rotational motion of tube 440, and hence, the rotational motion of the catheter, and provides a signal to the computer system via the communications interface. Thus, the interface device measures both the translational and rotational motion of the catheter, whereby these motions are partially dependent upon the force applied by the user to the catheter proximal end to enable catheter motion.

The computer system processes the encoder signals to enable the simulation to reflect catheter motion, and may provide control signals to actuator 428 to provide force feedback. In particular, actuator 428 may apply force to pulley 426 to enhance or oppose the catheter translational motion. The applied force may impede pulley and belt motion, thereby requiring additional force to manipulate the catheter. Conversely, the applied force may facilitate rotation of the pulley and enhance belt motion, thereby requiring less force to manipulate the catheter. The actuator applies force to pulley 426 in accordance with control signals determined by the computer system, whereby the forces may cause catheter 418 to store a certain amount of hysteresis or play for both translational and rotational motion (e.g., compression or stretching). This hysteresis or play is the difference between observed rotational and/or translational motion at the proximal and distal ends of catheter 418.

Figure 12:
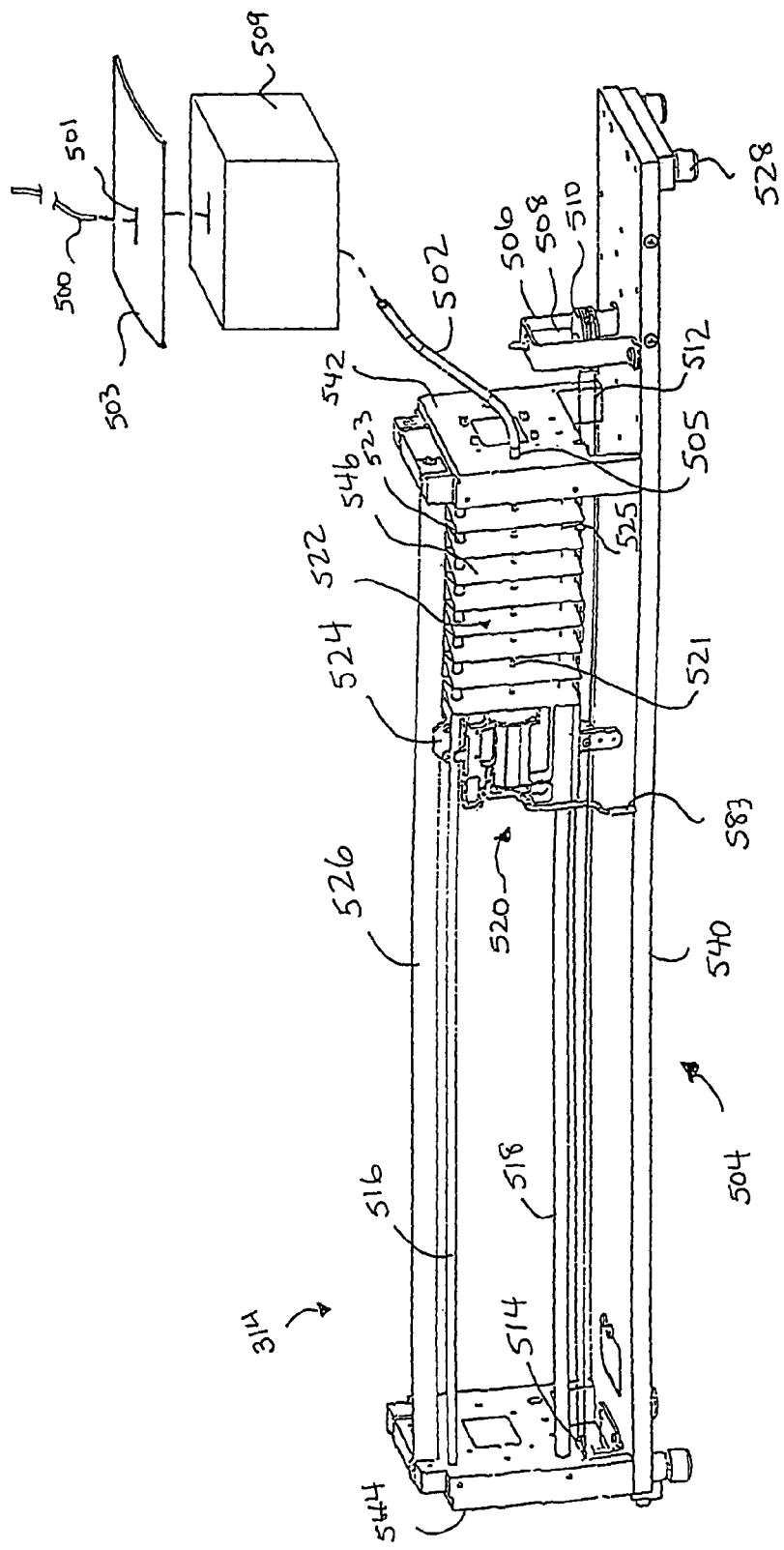
FIG. 12 is an exploded view in perspective of an alternative embodiment of the interface device of FIG. 11a according to the present invention.

An alternative embodiment of interface device 314 is illustrated in FIG. 12. Specifically, interface device 314 includes a frame 504 having a base 540 and supports 542, 544, and a carriage assembly 520 disposed between the supports. Base 540 includes legs 528, preferably constructed of rubber, to stabilize the device. Support 542 extends from a proximal portion of, and substantially perpendicular to, base 540, while support 544 extends from the distal end of the base substantially parallel to support 542. A bracket 506 is disposed proximally of support 542 on base 540, and supports a pulley 510 and an actuator 508 connected to the pulley via a shaft. A pulley 514 is disposed at a base distal end, whereby a belt 512 extends between and about the pulleys. Support 542 includes an opening 505 that receives a tube 502. The tube extends from the support to an orifice 501 defined in a plate 503 that is placed over the device proximal portion and includes a mock bodily region (not shown). Tube 502 is typically mounted within a foam block 509 to provide resiliency and emulate forces and movement of the entry site of a body encountered during a medical procedure. Tube 502 receives a catheter 500 and guides the catheter into the device.

Guide rods 516, 518 extend between supports 542, 544 and enable carriage assembly 520 to traverse base 540. Guide rod 516 extends between the upper portions of the supports, while guide rod 518 is disposed below and substantially parallel with guide rod 516, toward base 540. Further, an encoder bar or strip 526 extends between the supports adjacent guide rod 516 to enable measurement of catheter motion as described below. A bellows or stabilizer 522 is disposed between support 542 and the carriage assembly to prevent catheter 500 from buckling. Bellows 522 includes multiple leaves or sections 546 with each section adjoined via a hinge or fold and having guide openings 523, 525 and a stabilization opening 521. Guide openings 523, 525 are defined in each bellows section to receive and fit loosely over corresponding guide rods 516, 518, respectively, while stabilization opening 521 is defined toward the approximate center of each section to receive and prevent buckling of the catheter. The bellows is supported by guide rods 516, 518, and is typically not directly connected to the supports or carriage assembly.

The bellows is typically formed of a sheet of a thin, rigid substance, such as plastic, that is die or laser cut and subsequently folded. The hinges or folds of bellows 522 are preferably formed by removing a sufficient quantity of material, thereby providing a spring type action inducing the bellows to expand proportionally as carriage assembly 520 moves toward support 544. This enables stabilization holes 521 to be maintained at a relatively uniform distance, whereby this distance is sufficient to support the catheter and prevent buckling when the catheter is advanced into the interface device under typical amounts of translational force. Thus, the bellows serves to stabilize the catheter, similar to the function of the telescoping tubes described above. However, the bellows may expand to a length substantially greater than its length in a compressed state, thereby providing enhanced accommodation of multiple lumens (e.g., sheath, catheter and wire).

Referring to FIGS. 13a-13b, carriage assembly 520 includes a carriage 562, preferably a machined block of aluminum, having a guide 590 disposed on a top surface to engage guide rod 516, and a channel 592 formed through the carriage to engage guide rod 518. A fastener 596 extends down from a carriage side to engage belt 512 (FIG. 12), while an encoder 524 is disposed adjacent guide 590. A catheter channel 594 is formed through the intermediate portion of the carriage to receive catheter 500 from bellows 522. A collet bearing 566 is typically pressed into the distal portion of carriage 562 coincident channel 594. A collet 568 is disposed within bearing 566 such that the collet is rotatably coupled to carriage 562. A compression ring 574 is further disposed about the collet within a compression groove 569. The collet further includes relief holes 571, defined in the intermediate portion of the collet, and saw kerfs 573 that serve to separate the distal end of the collet into gripper jaws 567. The collet is tubular, preferably including a central channel, to enable instruments, such as catheters, wires and sheaths, to be inserted through the collet. Instruments having an appropriate dimension may be grasped by gripper jaws 567, while instruments having lesser dimensions may extend through the collet.

A spring 576 is disposed over collet 568, whereby the spring and collet are positioned within carriage 562. A collet expander 578 is inserted into carriage 562 adjacent spring 576 to compress that spring. A retainer 580 is disposed proximate the expander to maintain the collet expander and associated components within the carriage. A lever 582 is attached to carriage 562, via a pin 564, to control collet 568. In particular, when lever 582 is pivoted counterclockwise (e.g., toward support 542), the lever causes collet expander 578 to compress spring 576, thereby expanding jaws 567 to an open state. Conversely, pivoting the lever in a clockwise direction (e.g., toward support 544) enables expansion of spring 576 and compression of the jaws to a closed state.

An encoder disk 550 is pressed onto the proximal end of collet 568, while an encoder sensor 558 fits over the disk and is attached to carriage 562. Each of the above-described elements of the carriage assembly includes an opening to enable instruments, such as catheters, to be inserted into and/or through the assembly depending upon instrument dimensions as described above. Stabilization holes 521 are maintained coincident the element openings to stabilize the instrument and enable the instrument to be inserted into the carriage assembly. The carriage assembly traverses frame 504 via guide rods 516, 518 and is limited to translational motion as described below.

Figure 14A:
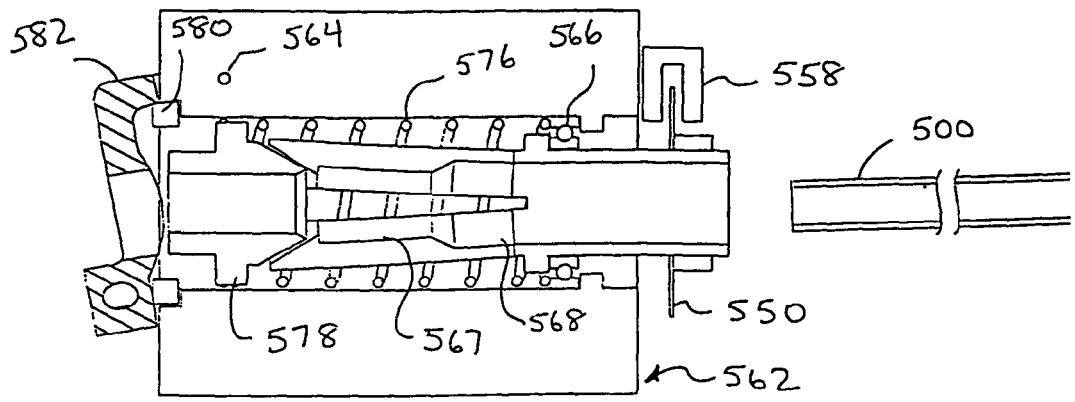
FIGS. 14a-14d are side views in elevation and partial section of the carriage assembly of the interface device of FIG. 12 illustrating operation of an instrument capture and quick-release mechanism.

Operation of the collet to engage an appropriately dimensioned instrument is illustrated in FIGS. 14a-14d. Specifically, lever 582 is pivoted about pivot pin 564 in a counterclockwise direction (e.g., toward the interface device proximal end), thereby forcing collet expander 578, disposed proximate the lever, further into the carriage assembly. The collet expander compresses spring 576, and includes a conical proximal tip that separates the collet distal end to enable jaws 567 to enter an open state for receiving an appropriately dimensioned instrument (FIG. 14a).

Figure 14B:
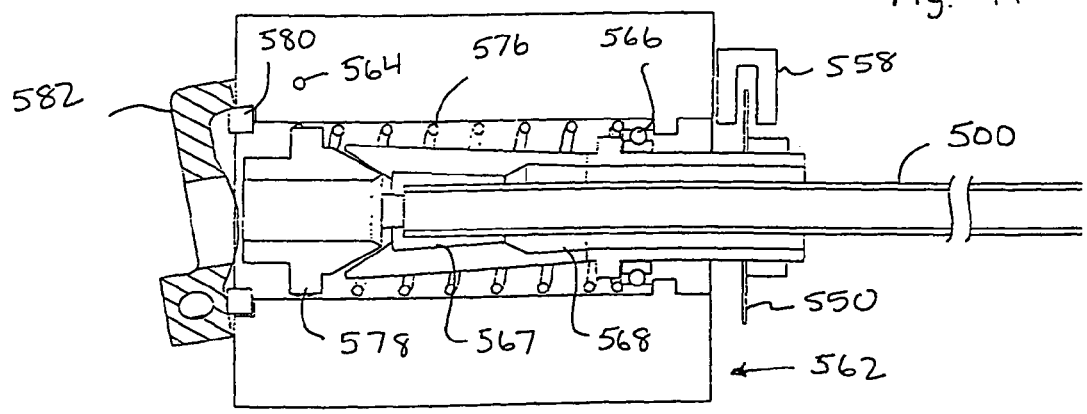
Figure 14C:
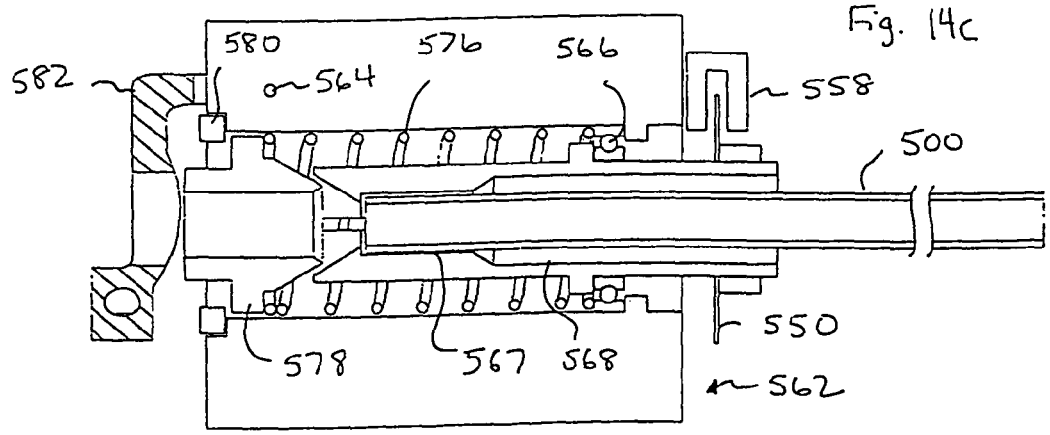
Figure 14D:
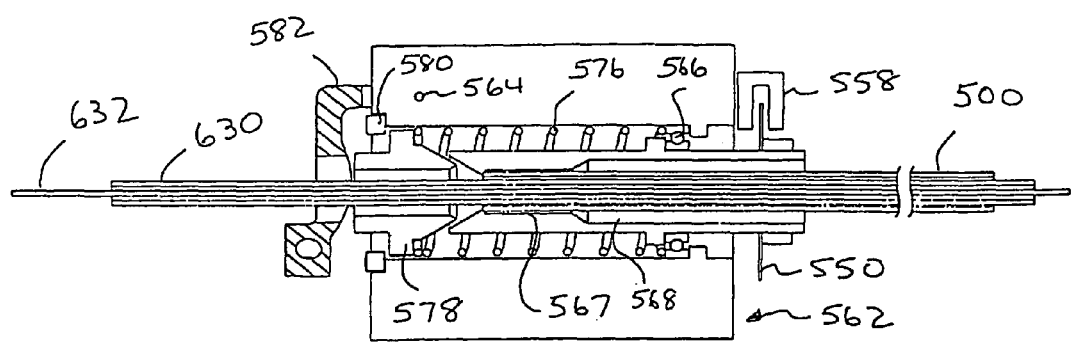

Once the collet jaws have entered an open state, an instrument, such as catheter 500, is inserted into the interface device and through the collet (FIG. 14b). Lever 582 is subsequently released (e.g., pivoted toward the interface device distal end), thereby allowing spring 576 to enter an expanded state. The spring forces collet expander 578 against retainer 580, and permits jaws 567 to enter their normally closed state to grasp catheter 500 (FIG. 14c).

The collet proximal portion is attached to encoder disk 550, whereby the collet rotates, via bearing 566, to reflect catheter rotation. Encoder disk 550 similarly rotates with collet 568, whereby encoder sensor 558 senses marks on the disk to measure rotation of the disk and the catheter.

The collets may be of varying dimensions to enable capture of a particular instrument. By way of example only, an assembly including wire 632, inner catheter 630 and catheter 500 is inserted into carriage 562 (FIG. 14d), whereby each of these instruments is independently manipulable. The collet includes sufficient dimensions to enable the assembly to traverse the carriage, while permitting jaws 567 to grasp catheter 500 in substantially the same manner described above. The carriage assembly thus measures motion of catheter 500, while wire 632 and inner catheter 630 extend to corresponding carriages (e.g., FIG. 15) having appropriately dimensioned collets to grasp and measure motion of these instruments in substantially the same manner described above.

Operation of the interface device is described with reference to FIGS. 12 and 13a-13b. Specifically, catheter 500 is inserted into orifice 501 by a user and traverses tube 502 and bellows 522 until being engaged by collet 568 of carriage assembly 520. Lever extension 583 is manipulated toward support 544 to pivot lever 582 and enable the collet to grasp the catheter as described above. The lever may alternatively be forced toward the interface device proximal end to actuate a quick-release as described above. Further insertion of catheter 500 into the interface device by the user forces carriage 520 to move toward support 544. As the carriage assembly traverses the base, encoder 524 senses marks on encoder bar 526 to measure translational motion of the carriage assembly, and hence, the catheter. The translational motion measured by the encoder differs from the translational motion of the catheter relative to the orifice since the catheter is subject to expansion and compression due to forces exerted by the user. The encoder provides a signal indicating the measured translational motion of the catheter to the computer system via the communications interface. Similarly, rotational motion of the catheter rotates encoder disk 550, thereby enabling sensor 558 to measure that rotational motion. The sensor provides a signal indicating the measured rotational motion to the computer system via the communications interface. The computer system processes the signals to update the display and determine force feedback signals.

Force feedback is accomplished via actuator 508 affecting pulley motion. Since the carriage assembly is connected to belt 512, the carriage assembly motion causes belt 512 to traverse and rotate pulleys 510, 514. Control signals from the computer system control the actuator to impede or enhance rotation of pulley 510. When pulley rotation is impeded, additional force is required to manipulate translational motion of the catheter, while enhancing pulley rotation enables less force to manipulate the catheter. Force feedback is typically utilized to simulate forces encountered during an actual procedure when inserting or removing a catheter within a patient. Thus, the user feels at the proximal end of the instrument forces imparted to the instrument distal end based on a simulated procedure.

Figure 15:
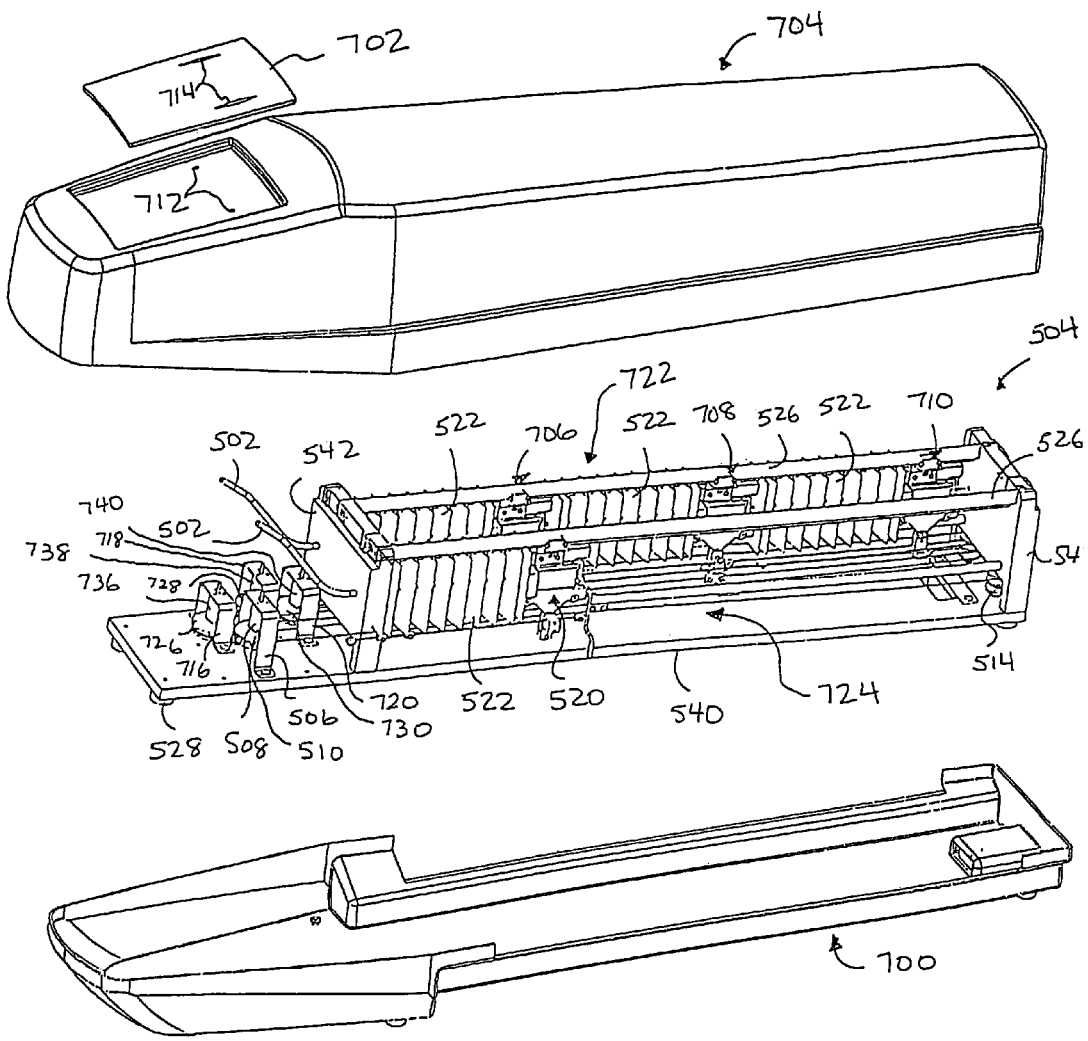
FIG. 15 is an exploded view in perspective of an alternative embodiment of the interface device of FIG. 12 accommodating plural independently inserted instruments according to the present invention.

An alternative interface device configuration for accommodating nested and/or independently inserted instruments is illustrated in FIG. 15. The interface device is substantially similar to, and functions in substantially the same manner as, the interface device described above for FIGS. 12, 13a-13b and 14a-14d except that the interface device of FIG. 15 accommodates nested and/or independently inserted instruments. Specifically, the interface device includes a base 700 for receiving frame 504 and its associated components, and a cover 704. The cover proximal portion typically includes openings or mock orifices 712 of a simulated anatomy (not shown), typically mounted on a platform 702, to enable instruments to be inserted into the interface device. Platform 702 generally includes openings 714 defined in the plate coincident orifices 712 to enable insertion of instruments into the interface device. Tubes 502 extend from orifices 712 to guide the instruments into the interface device. Tubes 502 may be disposed in a foam block (not shown) as described above.

Frame 504 is substantially similar to the frame described above for FIG. 12 and includes components for accommodating independently inserted instruments. The independently inserted instruments are accommodated by respective configurations 722 and 724 arranged in parallel relation. Configuration 724 is substantially similar to, and functions in substantially the same manner as, the configuration of FIG. 12 and receives an instrument, such as a catheter, through tube 502. Catheter motion is measured by carriage assembly 520, whereby signals indicating the measured motion are provided to the computer system to determine force feedback and update the display in substantially the same manner described above.

Configuration 722 is substantially similar to configuration 724 except that configuration 722 includes a plurality of carriage assemblies and corresponding bellows, belts, pulleys and actuators to measure manipulation of nested instruments, such as the wire, catheter and sheath assembly. In particular, configuration 722 includes brackets 716, 718, 720 disposed toward the frame proximal end having corresponding pulleys 726, 728, 730 and actuators 736, 738, 740. A plurality of corresponding pulleys (partially shown) are disposed at the frame distal end. Carriage assemblies 706, 708, 710 are substantially similar to and measure rotational and translational motion of a corresponding instrument in substantially the same manner described above for carriage assembly 520. Carriage assemblies 706, 708, 710 are each connected to respective belts disposed about and extending between the proximal and distal (partially shown) pulleys. The actuators and pulleys enable the carriage assemblies to provide force feedback to the particular instrument engaged by that assembly in substantially the same manner described above for carriage assembly 520. Bellows 522 are disposed between support 542 and carriage assembly 706, between carriage assemblies 706 and 708 and between carriage assemblies 708 and 710, to prevent buckling of the particular instruments as described above. The interface device may include any quantity (e.g., at least one) of configurations each having any quantity (e.g., at least one) of carriage assemblies to accommodate any desired quantity of instruments.

Figure 16:
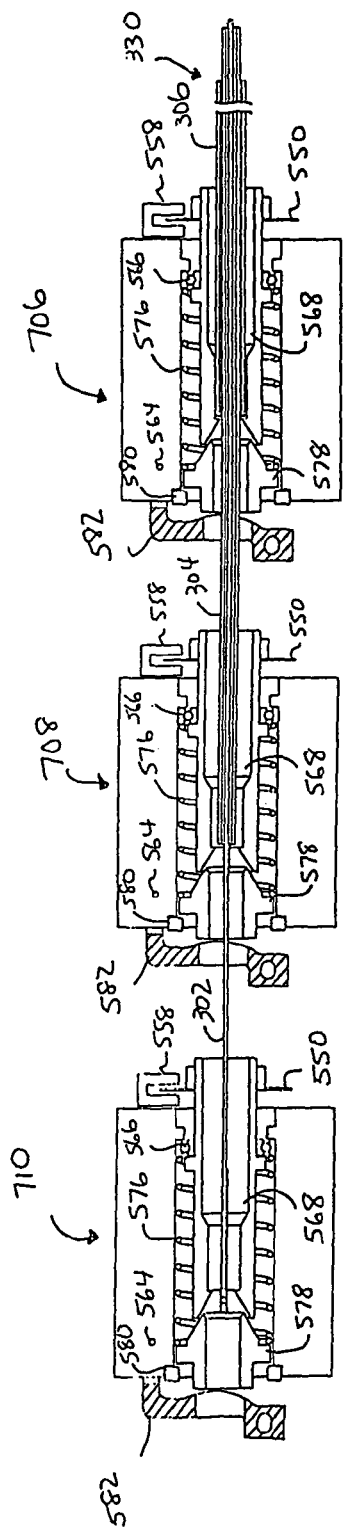
FIG. 16 is a side view in elevation and partial section of an interface device configuration of the device of FIG. 15 including plural carriage assemblies for accommodating a wire, catheter and sheath assembly according to the present invention.

The arrangement of carriage assemblies to accommodate nested instruments is illustrated in FIG. 16. Specifically, instrument assembly 330 (e.g., including wire 302, catheter 304 and sheath 306) is inserted into configuration 722 of the interface device and through a bellows 522 (not shown), whereby carriage assembly 706 includes a collet 568 of sufficient dimension to grasp the sheath as described above. The catheter and wire pass through carriage assembly 706 and extend through a bellows 522 (not shown) to carriage assembly 708 having a collet 568 of sufficient dimension to grasp the catheter. The wire further passes through carriage assembly 708 and extends through a bellows 522 (not shown) to carriage assembly 710 having a collet 568 of sufficient dimension to grasp the wire. The carriage assemblies each traverse guide rods 516 and 518 (not shown) and measure manipulation of and provide force feedback to the respective instruments as described above.

Operation of the interface device is described with reference to FIG. 15. Specifically, an instrument assembly (not shown e.g., including a wire, catheter and sheath) and another instrument (e.g., a catheter) are inserted by a user through corresponding orifices 712, 714 and traverse tube 502 to extend to the carriage assemblies. Configuration 724 measures manipulation of the instrument (e.g., catheter) as described above, while the instrument assembly extends through carriage assemblies 706, 708 and 710. Each carriage assembly 706, 708, 710 includes a collet of an appropriate dimension and captures, measures manipulation of, and provides force feedback to, a particular instrument (e.g., sheath, catheter and wire, respectively) as described above. Configurations 722, 724 operate in parallel to provide the computer system with measured manipulation signals for their corresponding instruments to enable the computer system to determine force feedback and update the display to reflect the manipulations for each instrument in substantially the same manner described above. Similarly, the interface device of FIG. 11a may include plural carrier assemblies to handle plural instruments, similar to the manner described above.

Figures 17A, 17B:
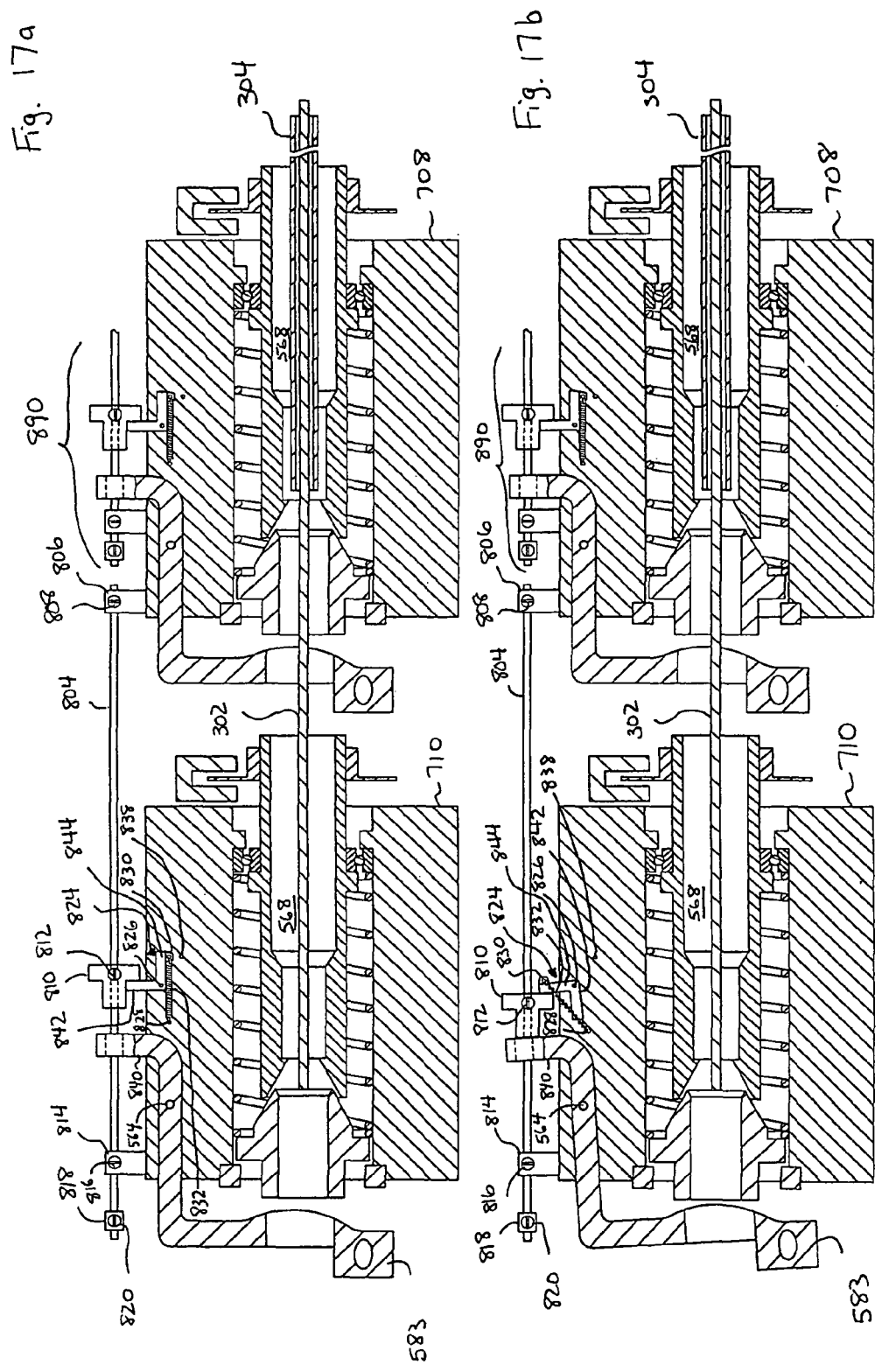

In order to enable automatic capture and release of instruments, the interface device may further include an automatic capture and release mechanism as illustrated in FIGS. 17a-17b. The interface device includes a configuration, similar to configuration 724 described above for FIG. 15, having carriage assemblies 706 (not shown), 708, 710 separated by bellows (not shown) and arranged in a manner substantially similar to FIG. 16. The mechanism is described with reference to carriage assemblies 708, 710 for illustrative purposes, whereby the mechanism may equally be employed between the remaining carriage assemblies or a carriage assembly and the frame as described below. Carriage assemblies 708, 710 are substantially similar to carriage assemblies 708, 710 described above except that the carriage assemblies further include components to facilitate an automatic capture and release mechanism. Specifically, carriage assembly 710 includes a bracket 814 extending from the carriage assembly upper portion, while carriage assembly 708 includes a bracket 806 extending from its upper portion. A rod 804 is disposed through openings defined in brackets 806, 814 to couple carriage assemblies 708, 710.

Bracket 814 includes a spring screw 816 having a spring-loaded nylon plunger to engage rod 804. The spring screw may be adjusted to control application of frictional force to rod 804, thereby simulating friction that may be encountered between nested instruments (e.g., wire 302 and catheter 304). Bracket 806 includes a set screw 808 for engaging rod 804, whereby translational motion of the rod is initiated in response to translational motion of carriage assembly 708. A stop 818 is disposed toward the distal and of rod 804 via a set screw 820. The stop limits the distance that wire 302 may be inserted into the interface device relative to catheter 304. This may be utilized to simulate hollow devices having a closed end, such as a heart placing lead. Generally, a wire stylet is utilized to stiffen the lead for navigation into the heart, whereby the stylet is removed at the completion of the procedure to return the lead to a flexible state. Additional stylet insertion is typically prevented by the end of the lead, which may be simulated by adjustment of stop 818.

A traveler 810 is secured to rod 804 via a set screw 812. The traveler is typically implemented by a 'T' shaped bracket, preferably rotated approximately ninety degrees, and moves translationally with rod 804 in response to translational motion of carriage assembly 708. In other words, differential translation of carriage assembly 708 with respect to carriage assembly 710 causes differential motion of traveler 810 relative to carriage assembly 710. The amount of rod motion is partially determined by the frictional force applied to the rod by spring screw 816. The traveler is preferably disposed on rod 804 coincident a portion of carriage assembly 710. In addition, lever extension 583 includes a projection 840 that extends beyond pivot pin 564 and interfaces rod 804 via an opening defined in the projection. The projection interfaces a portion of rod 804 disposed between bracket 814 and traveler 810. Traveler 810 manipulates projection 840 to pivot lever extension 583 in order to capture and release instruments as described below.

Carriage assembly 710 further includes a rocker 824, tension spring 832, rocker pivot pin 826, a fixed pin 828, movable pin 830 and stop pin 838, each disposed toward the upper portion of the carriage assembly. Rocker 824 is preferably implemented by an 'L' shaped bracket having linear sections 842, 844. Rocker 824 pivots about rocker pivot pin 826 disposed toward the interface or joining point of the rocker linear sections. Movable pin 830 is disposed toward the distal end of linear section 844 and moves in conjunction with rocker motion. Fixed pin 828 is disposed distally of rocker 824, whereby tension spring 832 is disposed between and coupled to the fixed and movable pins. The tension spring is utilized to force traveler 810 against projection 840 to overcome the bias of a lever spring (e.g., spring 576 of FIG. 13a) to manipulate the lever and capture and release instruments as described below. Stop pin 838 is disposed proximally of pivot pin 826 to limit rotation of rocker 824 as described below.

Exemplary operation of the automatic capture and release mechanism is described. Initially, wire 302 is captured by carriage assembly 710, while catheter 304 is captured by carriage assembly 708 (FIG. 17a). When wire 302 is withdrawn from the interface device, carriage assembly 710 is drawn toward carriage assembly 708, while carriage assembly 708 remains relatively stationary (e.g., since wire 302 passed through carriage assembly 708, while carriage assembly 708 engages catheter 304). Rocker 824 is initially positioned against stop pin 838 by clockwise torque applied by spring 832, with section 842 oriented to interface traveler 810. As rocker 824 is drawn toward traveler 810, section 842 interfaces the traveler, thereby causing the rocker to rotate about pivot pin 826 in a counterclockwise direction. Tension spring 832 exerts a force on movable pin 830 to exert a torque on the rocker. When rocker 824 rotates a sufficient amount to enable linear section 844 to be proximate the proximal side of traveler 810, the direction of torque applied by tension spring 832 to rocker 824 changes to a counterclockwise direction. As the rocker further rotates, the torque increases and section 844 interfaces the proximal side of traveler 810, thereby moving the traveler distally relative to carriage assembly 710. The traveler contacts projection 840, and pivots lever extension 583 toward carriage assembly 710 in response to overcoming the bias forces on the lever to release wire 302 (FIG. 17b). Wire 302 is released from carriage assembly 710, and carriage assemblies 708, 710 maintain their positions relative to each other due to the tension of spring 832 holding extension 844 against the proximal side of traveler 810. The wire may be withdrawn and exchanged for another instrument as described below.

A new instrument may be inserted through catheter 304 and into the interface device. The instrument is inserted to extend to carriage assembly 710. Additional insertion force causes carriage assembly 710 to move distally and away from carriage assembly 708. Section 844 of rocker 824 interfaces traveler 810, whereby the rocker is subsequently pivoted in a clockwise direction. As rocker 824 rotates, the torque applied by spring 832 decreases in the counterclockwise direction and ultimately changes to a clockwise direction. Stop pin 838 limits rotation of rocker 824 when the rocker rotates sufficiently to enable section 842 to be positioned proximate the distal side of traveler 810. The spring bias of lever extension 583 pivots the lever to capture the new instrument (FIG. 17a) as described above. Thus, the mechanism enables insertion or changing of instruments during a simulated procedure in a realistic manner without requiring manual pivoting of lever extension 583.

The automatic capture and release mechanism described above is generally employed between carriage assemblies 708, 710, between carriage assemblies 706, 708 (FIGS. 15 and 16), and between carriage assembly 706 and a frame proximal end or support in substantially the same manner described above. Specifically, each carriage assembly 706, 708, 710 typically includes the mechanism components of carriage assemblies 708, 710 described above (e.g., components 806 and 890 shown on carriage assembly 708 in FIGS. 17a-17b). The appropriate components (e.g., the carriage assemblies may not include or utilize some components; for example, bracket 806 of carriage assembly 710 (not shown) is typically not utilized since that assembly is not coupled to subsequent assemblies in the particular arrangement) are arranged to interface a corresponding rod as described above, whereby an independent rod is disposed between carriage assemblies 708, 710, between carriage assemblies 706, 708, and between carriage assembly 706 and an interface device frame. The rod associated with carriage assembly 706 is attached to the frame to serve as a ground, similar to the function of bracket 806 described above. The mechanism is implemented to facilitate automatic capture and release of the sheath, catheter and wire by respective carriage assemblers 706, 708, 710 in substantially the same manner described above. In addition, the automatic capture and release mechanism may alternatively utilize magnets (e.g., a magnet disposed on a carriage assembly and another magnet disposed on rod 804 or other support) to generate a magnetic force to overcome the lever bias and pivot the lever to desired positions, similar to the magnets described above for FIG. 3.

Similarly, the automatic capture and release mechanism may be utilized in the system of FIG. 3 to maintain the inner tube within the outer tube. The mechanism components may be attached to the inner and outer tubes in a manner similar to the carriage assembly arrangement described above.

It will be appreciated that the embodiments described above and illustrated in the drawings represent only a few of the many ways of implementing an interface device and method for interfacing instruments to medical procedure simulation systems.

The interface devices of the present invention may be utilized with various elongated or other instruments (e.g., endoscopes, catheters, wires, sheaths, etc.) for simulating a variety of medical procedures, and are not limited to the specific instruments or applications disclosed herein. The computer system of the medical procedure simulation system may be implemented by any conventional or other processing system. The communications interface may include any circuitry (e.g., analog to digital converters, digital to analog converters, etc.) and/or processors to transfer and/or convert signals for compatibility between an interface device and processing system. The functions of the communications interface may further be performed within the interface device or processing system.

The endoscope or other instruments may include various switches, buttons, dials or levers to simulate various events. For example, the endoscope switches may be used to simulate irrigation and suction and video captures including freeze frame and returning to dynamic video capture. The interface device and instrument capture mechanism may be utilized with actual endoscopes to permit medical practitioners to train with instruments used during endoscopic procedures. The endoscope may further include force feedback on the various switches or levers. The force feedback may be applied by an actuator configured to apply a static or dynamic force to the endoscope component. The actuator may be adjusted to provide a desired force.

The encoders of the interface devices and instruments may be implemented by any conventional or other encoders or devices, such as an optical encoder, an analog encoder or a potentiometer. The translational encoders of the interface devices may alternatively be implemented by a linear encoder reading a linear target strip, typically including light and dark bands, disposed along a motion path of the trolley, carrier or carriage. Force feedback may be provided by the interface devices via a passive or active braking mechanism or an active motor or other actuator attached to the trolley, carrier or carriage that utilizes frictional forces to impede motion (e.g., friction force against the frame, guide rods or guide rails). Moreover, additional force feedback units may be employed, similar to force feedback units described above, to impede rotational motion of instruments.

The interface devices may utilize any anatomical sites, such as a nostril, mouth, ear, anus, urethra, etc. Further, any types of orifices may be utilized such as orifices made surgically (e.g., an opening made in the stomach for laparoscopic procedures). The interface devices described above may each include a pivotable entry site, whereby the site may be pivoted to any desired position or orientation. Moreover, the interface devices may include any conventional or other types of pivoting mechanisms that can pivot the site in any quantity of or any particular degree of freedom. The simulation system may similarly simulate any desired anatomical site or orifice. In addition, the interface devices may include additional encoders as described above to measure the entry site orientation and enable the simulation system to simulate a procedure based on that orientation.

The capture mechanism may be implemented by any conventional or other devices, such as a collet (e.g., any type of standard collet (e.g., spring or screws)), chuck, quick connect (e.g., standard quick connects, such as those used for high pressure hoses), or quick-disconnect type devices that enable transmission of force and torque. The capture mechanism may utilize mechanical, magnetic (e.g., solenoid and plunger), air pressure, or other devices to effect capture. The automatic capture mechanism may utilize sensors and computer control to sense when to capture and release. Further, the present invention generally utilizes female type capture mechanisms, however, an instrument may be modified at the tip to fit over an expandable male fitting inside the interface device (e.g., scissors type, balloon, balls forced outward by a conical wedge, etc.). The capture mechanism and collet may be of any size or shape to accommodate a particular instrument. The carrier or carriage may be supported via guide rods, but may alternatively be supported via air bearings where the carrier or carriage includes a flat base supported by a surface with holes through which air is forced providing a thin layer of air between the carrier or carriage and support surface, thus a very low friction carrier or carriage friction guide. The carriage may utilize any conventional levers or switches manipulated in any fashion to facilitate capture and release. An interface device may include any quantity (e.g., at least one) of trolleys, carriers and carriages to accommodate any quantity of nested or other instruments.

The various encoders, actuators, pulleys, belts and other components of the present invention may be implemented by any conventional or other types of components performing the above-described functions. The components may be of any shape or size, may be constructed of any suitable materials, and may be arranged in any fashion within the interface devices. The trolley, carrier and carriages may be of any shape or size, and may move via any conventional or other devices, such as wheels, guide rails, tracks, sufficient slippery surface including air bearings, etc. The belts may be constructed of any suitable material, and may be implemented by any belt, cable, rope, chain or other suitable device. The belts may be disposed in any fashion within the interface device. The pulleys may be implemented by any type of pulley, gear or other device compatible with the belt. The interface device housing, frame and components may be of any size or shape, and may be constructed of any suitable materials. The various tubes (e.g., inner, outer, guide, etc.) of the interface devices may be of any size, shape or length, and may be constructed of any suitable materials.

The set screws utilized in the present invention may be implemented by any conventional set screws or any other conventional device for grasping an instrument. The inner or other interface device tubes may be attached to the frame and/or trolley, carrier, or carriage via any conventional or other techniques. The bellows may be of any quantity, shape or size and may be constructed of any suitable materials. The bellows may be implemented by any device capable of supporting an instrument and preventing buckling. In particular, the anti-buckling function provided by telescoping tubes or by bellows herein may also be provided by a tube which has been slit to enable a portion of the carriage (e.g. the capture mechanism and zero or more sensors) and the medical tool to move inside the tube while the remainder of the carriage moves outside the slit. The slit is of sufficiently small width to prevent the medical tool from buckling out through the slit, but is of a sufficiently wide dimension so as to allow the two portions of the carriage inside and outside the tube to be coupled. A long hole drilled close to and parallel to the surface of a solid material, with a slit cut into the material extending into the hole may be substituted for the slit tube. The foam block may be implemented by any sufficiently resilient material. The automatic capture mechanism may utilize rods of any quantity (e.g., at least one), shape (e.g., round or rectangular) or size. The mechanism may utilize any mechanical, electrical or other forces to pivot the lever for capture or release, such as magnets, springs, rubber bands, etc. Similarly, these devices may be utilized with the inner and outer tube mechanism to enable capture and release. The mechanism may be employed in any quantity to automatically engage particular instruments, and may extend to any number of mutually coaxial instruments.

The various interface device embodiments may be implemented either individually or in any combination to accommodate various instruments. Further, the various manners of measuring instrument manipulation and providing force feedback within the interface devices may be utilized in any of the above-described embodiments.

It is to be understood that the terms "upper", "lower", "top", "bottom", "side", "length", "up", "down", "front", "rear", "back", "clockwise" and "counterclockwise" are used herein merely to describe points of reference and do not limit the present invention to any specific configuration or orientation.

From the foregoing description, it will be appreciated that the invention makes available a novel interface device and method for interfacing instruments to medical procedure simulation systems wherein various instruments are interfaced to a medical procedure simulation system to simulate performance of a variety of medical procedures.

Having described preferred embodiments of a new and improved interface device and method for interfacing instruments to medical procedure simulation systems, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An apparatus for simulating a procedure, comprising:
 a capture mechanism comprising:
  a first end and a second end,
  a length dimension and a cross-sectional dimension,
 the capture mechanism configured to:
  receive an insertion device therein at the first end,
  automatically adjust the cross-sectional dimension in response to the insertion device adjusting the length dimension while moving in a longitudinal direction within the capture mechanism toward the second end of the capture mechanism, the adjusted cross-sectional dimension of the capture mechanism configured to either grasp or release the insertion device from the capture mechanism based on the movement of the insertion device with respect to the second end,
  provide a rotational degree of freedom to the insertion device while the capture mechanism has grasped the insertion device such that the insertion device remains grasped while being manipulated in the rotational degree of freedom, and
  couple to and move with a carrier assembly, the carrier assembly moveable in a translational degree of freedom.

2. The apparatus of claim 1, wherein the capture mechanism further comprises a lock and release mechanism for automatically locking or releasing the insertion device based on the movement of the insertion device with respect to the capture mechanism.

3. The apparatus of claim 1, further comprising a mock anatomical site including an aperture adapted to receive the insertion device, the capture mechanism in communication with the aperture.

4. The apparatus of claim 3, wherein the mock anatomical site is configured to be pivotable.

5. The apparatus of claim 1, further comprising at least one actuator configured to apply force feedback to the insertion device when engaged with the capture mechanism, wherein the actuator applies the force feedback in response to receiving an activating signal based on the one or more signals from the sensor.

6. The apparatus of claim 1, wherein the capture mechanism further comprises a plurality of capture mechanisms, each configured to separately engage a corresponding one of a plurality of insertion devices.

7. An apparatus for simulating a procedure comprising:
 a capture mechanism comprising:
  a first end and a second end,
  a length dimension and a cross-sectional dimension,
 the capture mechanism configured to:
  receive an insertion device at the first end,
  adjust the cross-sectional dimension in response to the insertion device adjusting the length dimension by moving in a longitudinal direction within the capture mechanism with respect to the second end to either grasp or release the insertion device,
  provide a rotational degree of freedom to an insertion device while the capture mechanism has grasped the insertion device such that the insertion device remains grasped while being manipulated in the rotational degree of freedom, and
  couple to and move with a carrier assembly, the carrier assembly moveable in a translational degree of freedom;
 a sensor configured to measure a translational movement and a rotational movement of the insertion device when engaged with the capture mechanism, wherein the sensor provides one or more signals associated with the measured translation and rotational movement to a processor; and
 at least one actuator configured to apply force feedback to the insertion device when engaged with the capture mechanism, wherein the actuator applies the force feedback in response to receiving an activating signal from the processor based on the one or more signals from the sensor.

8. The apparatus of claim 7, wherein the capture mechanism further comprises an lock and release mechanism for automatically locking or releasing the insertion device based on the movement of the insertion device with respect to the capture mechanism.

9. The apparatus of claim 7, further comprising a mock anatomical site including an aperture adapted to receive the insertion device, the capture mechanism in communication with the aperture.

10. The apparatus of claim 9, wherein the mock anatomical site is configured to be pivotable.

11. The apparatus of claim 7, wherein the capture mechanism further comprises a plurality of capture mechanisms, each configured to separately engage a corresponding one of a plurality of insertion devices.

12. An apparatus for simulating a procedure to a user comprising:

a capture mechanism having a length dimension and a cross-sectional dimension, the capture mechanism configured to:
- receive an insertion device at a first end, wherein the capture mechanism automatically adjusts the cross-sectional dimension in response to the insertion device adjusting the length dimension by moving in a longitudinal direction within the capture mechanism with respect to an opposed second end, the adjusted cross-sectional dimension of the capture mechanism configured to either grasp or release the insertion device,
- provide a rotational degree of freedom to an insertion device while the capture mechanism has grasped the insertion device such that the insertion device remains grasped while being manipulated in the rotational degree of freedom, and
- couple to and move with a carrier assembly, the carrier assembly moveable in a translational degree of freedom;

a sensor configured to measure a translational movement and a rotational movement of the insertion device when engaged with the capture mechanism, wherein the sensor provides one or more positional signals associated with the measured translation and rotational movement to a processor; and a display coupled to the processor and configured to display a representation of the insertion device within a simulated environment, wherein the representation of the insertion device moves within the simulated environment in response the one or more positional signals.

13. The apparatus of claim 12, wherein the capture mechanism further comprises an lock and release mechanism for automatically locking or releasing the insertion device based on the movement of the insertion device with respect to the capture mechanism.

14. The apparatus of claim 12, further comprising a mock anatomical site including an aperture adapted to receive the insertion device, the capture mechanism in communication with the aperture.

15. The apparatus of claim 14, wherein the mock anatomical site is configured to be pivotable.

16. The apparatus of claim 12, further comprising at least one actuator configured to apply force feedback to the insertion device when engaged with the capture mechanism, wherein the actuator applies the force feedback in response to receiving an activating signal based on the one or more signals from the sensor.

17. The apparatus of claim 12, wherein the capture mechanism further comprises a plurality of capture mechanisms, each configured to separately engage a corresponding one of a plurality of insertion devices.

18. The apparatus of claim 1 wherein the cross-sectional dimension of the capture mechanism is configured to increase as the length dimension is decreased.

19. The apparatus of claim 7 wherein the cross-sectional dimension of the capture mechanism is configured to increase as the length dimension is decreased.

20. The apparatus of claim 12 wherein the cross-sectional dimension of the capture mechanism is configured to increase as the length dimension is decreased.

* * * * *

UNITED STATES PATENT AND TRADEMARK OFFICE
CERTIFICATE OF CORRECTION

| | | |
|---|---|---|
| PATENT NO. | : 8,480,406 B2 | Page 1 of 1 |
| APPLICATION NO. | : 11/204646 | |
| DATED | : July 9, 2013 | |
| INVENTOR(S) | : David Alexander et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this
Twenty-fourth Day of February, 2015

Michelle K. Lee
*Deputy Director of the United States Patent and Trademark Office*